US007292772B2

(12) United States Patent
Ueda

(10) Patent No.: US 7,292,772 B2
(45) Date of Patent: Nov. 6, 2007

(54) METHOD AND APPARATUS FOR DECODING AND RECORDING MEDIUM FOR A CODED VIDEO STREAM

(75) Inventor: Mamoru Ueda, Kanagawa (JP)

(73) Assignee: Sony Corporation, Tokyo (JP)

( * ) Notice: Subject to any disclaimer, the term of this patent is extended or adjusted under 35 U.S.C. 154(b) by 912 days.

(21) Appl. No.: 09/866,288

(22) Filed: May 25, 2001

(65) Prior Publication Data

US 2002/0009287 A1    Jan. 24, 2002

(30) Foreign Application Priority Data

May 29, 2000    (JP)    ............................. 2000-158546

(51) Int. Cl.
*G11B 27/00*    (2006.01)

(52) U.S. Cl. .......................... 386/52; 386/386; 386/68; 386/112; 386/33

(58) Field of Classification Search ................ 348/390, 348/400, 384, 401, 423, 415
See application file for complete search history.

(56) References Cited

U.S. PATENT DOCUMENTS

| | | | | |
|---|---|---|---|---|
| 5,377,051 A | * | 12/1994 | Lane et al. ................... | 386/81 |
| 5,379,070 A | | 1/1995 | Retter et al. | |
| 5,510,842 A | * | 4/1996 | Phillips et al. ......... | 375/240.25 |
| 5,532,744 A | * | 7/1996 | Akiwumi-Assani et al. ....................... | 348/390.1 |
| 5,623,615 A | * | 4/1997 | Salem et al. ................ | 712/238 |
| 5,640,210 A | | 6/1997 | Knee et al. | |
| 5,664,044 A | | 9/1997 | Ware | |
| 5,675,424 A | | 10/1997 | Park | |
| 5,982,431 A | | 11/1999 | Chung | |
| 6,263,023 B1 | * | 7/2001 | Ngai ...................... | 375/240.12 |
| 6,505,153 B1 | * | 1/2003 | Van Thong et al. ........ | 704/211 |
| 6,848,117 B1 | * | 1/2005 | Emura ......................... | 725/87 |
| 2002/0114388 A1 | * | 8/2002 | Ueda et al. ............ | 375/240.01 |
| 2003/0095789 A1 | * | 5/2003 | Wakimoto et al. ............ | 386/52 |

FOREIGN PATENT DOCUMENTS

EP    0 614 317    9/1994
EP    0 664 650    7/1995

OTHER PUBLICATIONS

Patent Abstracts of Japan vol. 2000, No. 04, Aug. 31, 2000 & JP 2000 032396 A (Victor Co of Japan Ltd), Jan. 28, 2000.

* cited by examiner

*Primary Examiner*—Thai Q. Tran
*Assistant Examiner*—Helen Shibru
(74) *Attorney, Agent, or Firm*—Frommer Lawrence & Haug LLP; William S. Frommer; Paul A. Levy

(57) ABSTRACT

A video decoder reproduces an MP@ML/MPEG-2 video bit stream at an arbitrary speed. When a slice decoder control circuit receives parameters, the slice decoder control circuit sequentially supplies parameters of a picture layer and a write pointer associated with a first slice to a first slice decoder, the parameters of the picture layer and a write pointer associated with a second slice to a second slice decoder, the parameters of the picture layer and a write pointer associated with a third slice to a third slice decoder, so that the slices are decoded by the respective slice decoders. On the basis of signals indicating completion of decoding, received from the first to third slice decoders, the slice decoder control circuit gives commands the first to third slice decoders to decode particular slices.

24 Claims, 28 Drawing Sheets

FIG. 2 (Prior Art)

| Profile and Level | UPPER LIMIT | | | | |
|---|---|---|---|---|---|
| | Bit rates (Mbit/s) | Samples/line | Lines/Frame | Frames/sec | Samples/sec |
| 4:2:2P@HL | 300 | 1920 | 1152 | 60 | 62,668,800 |
| 4:2:2P@ML | 50 | 720 | 608 | 30 | 11,059,200 |
| MP@HL | 80 | 1920 | 1152 | 60 | 62,668,800 |
| MP@HL-1440 | 60 | 1440 | 1152 | 60 | 47,001,600 |
| MP@ML | 15 | 720 | 576 | 30 | 10,368,000 |
| MP@LL | 4 | 352 | 288 | 30 | 3,041,280 |
| SP@ML | 15 | 720 | 576 | 30 | 10,368,000 |

FIG. 5 (Prior Art)

| sequence_header ( ) { | NUMBER OF BITS | MNEMONIC |
|---|---|---|
| sequence_header_code | 32 | bslbf |
| horizontal_size_value | 12 | uimsbf |
| vertical_size_value | 12 | uimsbf |
| aspect_ratio_information | 4 | uimsbf |
| frame_rate_code | 4 | uimsbf |
| bit_rate_value | 18 | uimsbf |
| marker_bit | 1 | "1" |
| vbv_buffer_size_value | 10 | uimsbf |
| constrained_parameters_flag | 1 | |
| load_intra_quantiser_matrix | 1 | |
| if(load_intra_quantiser_matrix) | | |
|     intra_quantiser_matrix[64] | 8*64 | uimsbf |
| load_non_intra_quantiser_matrix | 1 | |
| if(load_non_intra_quantiser_matrix) | | |
|     non_intra_quantiser_matrix[64] | 8*64 | uimsbf |
| next_start_code ( ) | | |
| } | | |

FIG. 6 (Prior Art)

| sequence_extension ( ) { | NUMBER OF BITS | MNEMONIC |
|---|---|---|
| extension_start_code | 32 | bslbf |
| extension_start_code_identifier | 4 | uimsbf |
| profile_and_level_indication | 8 | uimsbf |
| progressive_sequence | 1 | uimsbf |
| chroma_format | 2 | uimsbf |
| horizontal_size_extension | 2 | uimsbf |
| vertical_size_extension | 2 | uimsbf |
| bit_rate_extension | 12 | uimsbf |
| marker_bit | 1 | bslbf |
| vbv_buffer_size_extension | 8 | uimsbf |
| low_delay | 1 | uimsbf |
| frame_rate_extension_n | 2 | uimsbf |
| frame_rate_extension_d | 5 | uimsbf |
| next_start_code ( ) | | |
| } | | |

FIG. 7 (Prior Art)

| group_of_picture_header ( ) { | NUMBER OF BITS | MNEMONIC |
|---|---|---|
| group_start_code | 32 | bslbf |
| time_code | 25 | bslbf |
| closed_gop | 1 | uimsbf |
| broken_link | 1 | uimsbf |
| next_start_code ( ) | | |
| } | | |

FIG. 8 (Prior Art)

| picture_header ( ) { | NUMBER OF BITS | MNEMONIC |
|---|---|---|
| picture_start_code | 32 | bslbf |
| temporal_reference | 10 | uimsbf |
| picture_coding_type | 3 | uimsbf |
| vbv_delay | 16 | uimsbf |
| if(picture_coding_type==2‖ picture_coding_type==3){ | | |
|     full_pel_forward_vector | 1 | |
|     forward_f_code | 3 | uimsbf |
| } | | |
| if(picture_coding_type==3) | | |
|     full_pel_forward_vector | 1 | |
|     backward_f_code | 3 | uimsbf |
| } | | |
| while(nextbits( )=="1") { | | |
|     extra_bit_picture/*with the value "1"*/ | 1 | uimsbf |
|     extra_information_picture | 8 | |
| } | | |
| extra_bit_picture/*with the value "0"*/ | 1 | uimsbf |
| next_start_code ( )t | | |
| } | | |

FIG. 9  (Prior Art)

| picture_coding_extension ( ) { | NUMBER OF BITS | MNEMONIC |
|---|---|---|
| extension_start_code | 32 | bslbf |
| extension_start_code_identifier | 4 | uimsbf |
| f_code[0][0]/*forward horizontal*/ | 4 | uimsbf |
| f_code[0][1]/*forward vertical*/ | 4 | uimsbf |
| f_code[1][0]/*backward horizontal*/ | 4 | uimsbf |
| f_code[1][1]/*backward vertical*/ | 4 | uimsbf |
| intra_dc_precision | 2 | uimsbf |
| picture_structure | 2 | uimsbf |
| top_field_first | 1 | uimsbf |
| frame_pred_frame_dct | 1 | uimsbf |
| concealment_motion_vectors | 1 | uimsbf |
| q_scale_type | 1 | uimsbf |
| intra_vlc_format | 1 | uimsbf |
| alternate_scan | 1 | uimsbf |
| repeat_first_field | 1 | uimsbf |
| chroma_420_type | 1 | uimsbf |
| progressive_frame | 1 | uimsbf |
| composite_display_flag | 1 | uimsbf |
| if(composite_display_flag) { | | |
| v_axis | 1 | uimsbf |
| field_sequence | 3 | uimsbf |
| sub_carrier | 1 | uimsbf |
| burst_amplitude | 7 | uimsbf |
| sub_carrier_phase | 8 | uimsbf |
| } | | |
| next_start_code ( ) | | |
| } | | |

FIG. 10    (Prior Art)

| picture_data ( ) { | NUMBER OF BITS | MNEMONIC |
|---|---|---|
| do { | | |
| slice ( ) | | |
| } while (nextbits( )==slice_start_code) | | |
| next_start_code( ) | | |
| } | | |

FIG. 11 (Prior Art)

| slice ( ) { | NUMBER OF BITS | MNEMONIC |
|---|---|---|
| slice_start_code | 32 | bslbf |
| if(vertical_size>2800) | | |
|    slice_vertical_position_extention | 3 | uimsbf |
| if(<sequence_scalable_extention( ) is present in the bitstream>) | | |
|    if(<scalable_mode=="data partitioning") | | |
|      priority_breakpoint | 7 | uimsbf |
| quantiser_scale_code | 5 | uimsbf |
| if(nextbits( )=="1") { | | |
|    intra_slice_flag | 1 | uimsbf |
|    intra_slice_ | 1 | uimsbf |
|    reserved_bits | 7 | uimsbf |
|    while(nextbits( )=="1") { | | |
|      extra_bit_slice/*with the value "1"*/ | 1 | uimsbf |
|      extra_information_slice | 8 | uimsbf |
|    } | | |
| } | | |
| extra_bit_slice/*with the value "0"*/ | 1 | uimsbf |
| do { | | |
|    macroblock ( ) | | |
| } while (nextbits( )!='000 0000 0000 0000 0000 0000') | | |
| next_start_code ( )t | | |
| } | | |

FIG. 12 (Prior Art)

| macroblock ( ) { | NUMBER OF BITS | MNEMONIC |
|---|---|---|
| while (nextbits( )=='0000 0001 000') | | |
| macroblock_escape | 11 | bslbf |
| macroblock_address_increment | 1-11 | vlclbf |
| macroblock_modes( ) | | |
| if(macroblock_quant) | | |
| quantiser_scale_code | 5 | uimsbf |
| if(macroblock_motion_forward || | | |
| (macroblock_intra && concealment_motion_vectors)) | | |
| motion_vectors(0) | | |
| if(macroblock_motion_backward) | | |
| motion_vectors(1) | | |
| if(macroblock_intra && concealment_motion_vectors)) | | |
| marker_bit | 1 | bslbf |
| if(macroblock_pattern) | | |
| coded_block_pattern( ) | | |
| for(1=0; j<block_count; i++) { | | |
| block(i) | | |
| } | | |
| } | | |

FIG. 13 (Prior Art)

| macroblock_modes ( ) { | NUMBER OF BITS | MNEMONIC |
|---|---|---|
| macroblock_type | 1-9 | vlclbf |
| if((spatial_temporal_weight_code_flag==1)&& | | |
| (spatial_temporal_weight_code_table_index!="00")) { | | |
| spatial_temporal_weight_code | 2 | uimsbf |
| } | | |
| if(macroblock_motion_forward || | | |
| macroblock_motion_backward) { | | |
| if(picture_structure=='frame') { | | |
| if(frame_pred_frame_dct==0) | | |
| frame_motion_type | 2 | uimsbf |
| } else { | | |
| field_motion_type | 2 | uimsbf |
| } | | |
| } | | |
| if((picture_structure=="frame picture") && | | |
| (frame_pred_frame_det==0) && | | |
| (macroblock_intra||macroblock_pattern)) { | | |
| dct_type | 1 | uimsbf |
| } | | |
| } | | |

FIG. 14 (Prior Art)

| NAME | Start code value |
|---|---|
| Picture_start_code | 00 |
| Slice_start_code | 01 ~ AF |
| Reserved | B0 |
| Reserved | B1 |
| User_data_start_code | B2 |
| Sequence_header_code | B3 |
| Sequence_error_code | B4 |
| Extension_start_code | B5 |
| Reserved | B6 |
| Sequence_end_code | B7 |
| Group_start_code | B8 |
| System_start_code | B9 ~ FF |

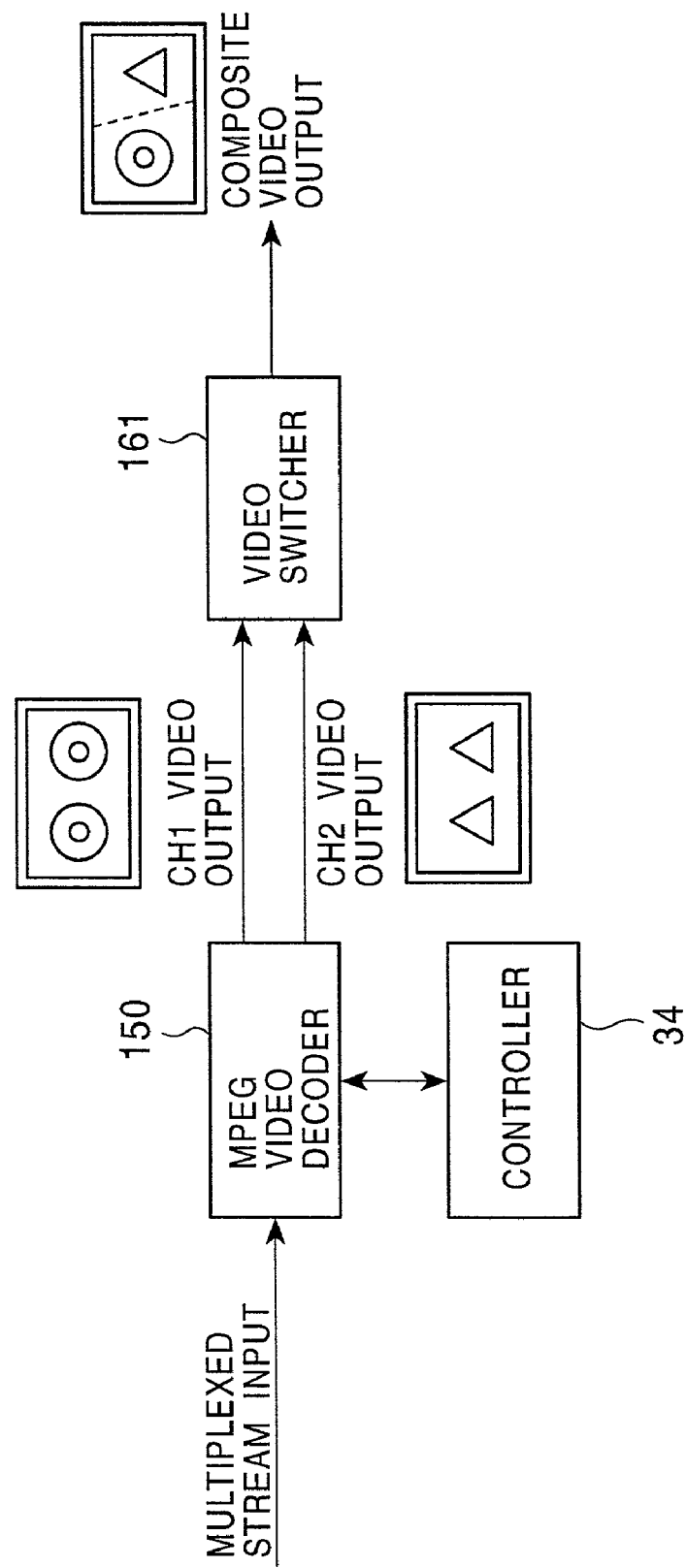

METHOD AND APPARATUS FOR DECODING AND RECORDING MEDIUM FOR A CODED VIDEO STREAM

BACKGROUND OF THE INVENTION

1. Field of the Invention

The present invention relates to a decoding method and apparatus and a storage medium. More particularly, the present invention relates to a decoding method and apparatus and a storage medium, suitable for decoding an MPEG-2 video bit stream.

2. Description of the Related Art

The MPEG (Moving Picture Experts Group)-2 is a method of coding a video signal into a high-efficiency compressed form according to the standard ISO/IEC (International Standards Organization/International Electrotechnical Commission) 13818-2 and the recommendation ITU-T (International Telecommunication Union-Telecommunication sector) H.262.

According to the MPEG-2 technique, respective pictures in a video signal are coded into one of three picture forms which are different in coding efficiency (intraframe coded picture (I picture), interframe forward predictive coded picture (P picture), and bidirectional predictive coded picture (B picture)). In the case of I pictures, coding is performed on the basis of spatial correlation within a frame of a picture. In P pictures, coding is performed using motion prediction with respect to a previous I or P picture. In the case of B pictures, coding is performed using motion compensation with respect to a previous or following I or P picture. Thus, coding efficiency increases in the order I, P, and B pictures.

Coding according to MPEG-2 is described in further detail with reference to FIG. 1. In the case where a video signal is coded into, for example, $I_1$, $B_2$, $B_3$, $P_4$, . . . , $P_{13}$ (where subscripts denote the order in which pictures are displayed), the picture $I_1$ is coded on the basis of spatial correlation within a frame, the picture $P_4$ is coded on the basis of a motion compensation prediction from the picture $I_1$, and the image $P_7$ is coded on the basis of a motion compensation prediction from the picture $P_4$. Furthermore, for example, the image $B_2$ is coded on the basis of a motion compensation prediction from the picture $I_1$ and the picture $P_4$, and the image $B_5$ is coded on the basis of a motion compensation prediction from the picture $P_4$ and the picture $P_7$.

MPEG-2 coded streams are classified according to a profile determined by the coding method and a level determined by the number of pixels to be handled so that MPEG-2 coded streams can be used in a wide variety of applications. Of various MPEG-2 classes, for example, MP@ML (Main Profile/Main Level) is widely used in DVB (Digital Video Broadcast) and DVD (Digital Versatile Disk). The profile and the level are described in sequence_extension which will be described later with reference to FIG. 6.

4:2:2P (4:2:2 Profile) is defined as a profile for an MPEG-2 coded stream adapted for use in broadcasting. In 4:2:2P, the upper limit of the bit rate is set to a sufficiently high value so that a color difference signal of a video signal can be treated according to the 4:2:2 format in a similar manner to a conventional baseband signal. As one of levels of MPEG-2 coded streams, HL (High Level) is defined for use in coding a next-generation high-resolution video signal.

FIG. 2 illustrates representative examples of classes defined in the MPEG-2 standard. They are 4:2:2P@HL (4:2:2 Profile High Level), 4:2:2P@ML (4:2:2 Profile Maine Level), MP@HL (Main Profile High Level), MP@HL-1440 (Main Profile High Level-1440), MP@ML (Main Profile Main Level), HP@LL (Main Profile Low Level), and SP@ML (Simple Profile Main Level). In FIG. 2, the upper limits of the respective parameters (bit rate, the number of samples per line, the number of lines per frame, processing time per frame, processing time per sample) are also shown.

As shown in FIG. 2, in 4:2:2P@HL, the upper limit of the bit rate is 300 Mbits/sec, and the upper limit of the number of pixels is 62,668,800 pixels/sec. On the other hand, in MP@ML, the upper limit of the bit rate is 15 Mbits/sec and the upper limit of the number of pixels is 10,368,000 pixels/sec. That is, a video decoder for decoding a video signal into the 4:2:2P@HL format needs processing abilities 20 times higher in terms of the bit rate and of about 6 times higher in terms of the number of pixels than are needed for an MP@ML video decoder.

The level structure of an MPEG-2 video bit stream is described below with reference to FIG. 3. At the beginning of a picture layer at the top, sequence_header is described. sequence_header defines header data of a bit stream sequence. In the case where the bit stream has no sequence_extension following first sequence_header of the sequence, the rule described in ISO/IEC11172-2 is applied to that bit stream. On the other hand, if there is sequence_extension after first sequence_header of the sequence, sequence_extension is put immediately after any sequence_header generated thereafter. Thus, in the specific example shown in FIG. 3, sequence_extension is put immediately after each sequence_header.

sequence_extension defines extension data in a sequence layer of the MPEG bit stream. sequence_extension is placed only immediately after sequence_header, and sequence_extension is not allowed to be placed immediately before sequence_end_code at the end of the bit stream so that no frame is lost after performing decoding and reordering of frames. Furthermore, when the bit stream includes sequence_extension, picture_coding_extension is placed immediately after each picture_header.

A GOP (Group Of Picture) includes a plurality of pictures. GOP_header defines header data in a GOP layer of the MPEG bit stream. Furthermore, data elements defined by picture_header and picture coding_extension are described in the bit stream. One picture is coded in picture_data following picture_coding_extension after picture_header. The first coded frame following GOP_header is a coded I frame (that is, the first picture after GOP_header is an I-picture). In the ITU-T recommendation H.262,various extensions in addition to sequence_extension and picture_coding_extension are also defined, although they are not described herein.

picture_header defines header data of a picture layer of the MPEG bit stream. Picture_coding_extension defines extension data of the picture layer of the MPEG bit stream.

picture_data describes data elements in a slice layer and a macroblock layer of the MPEG bit stream. picture_data is divided into a plurality of slices, and each slice is divided into a plurality of macro_block, as shown in FIG. 3.

Each macroblock includes 16×16 pixel data. Macroblocks at the beginning and at the end of a slice are not skip macroblocks (macroblocks containing no information). In the case of frame pictures which can be coded using a frame DCT (Discrete Cosine Transform) and a field DCT, macroblocks subjected to frame coding and macroblock subjected to field coding are different in internal structure.

Each macroblock includes one area in which luminance components are described and one area in which color difference components are described. The term "macroblock" is used to describe an information source, decoded data, or a corresponding coded data component. A macroblock is formed in one of three color difference formats, 4:2:0, 4:2:2, or 4:4:4. The manner in which blocks are arranged in a macroblock varies depending upon the color difference format.

FIG. 4(A) illustrates a macroblock in the color difference format of 4:2:0. In the 4:2:0 format, a macroblock is composed of four luminance (Y) blocks and two color difference blocks (one Cb block and one Cr block). FIG. 4(B) illustrates a macroblock in the color difference format of 4:2:0. In the 4:2:2 format, a macroblock is composed of four luminance (Y) blocks and four color difference blocks (two Cb blocks and two Cr blocks).

Each macroblock can be predictive-coded in one of two modes: a field prediction mode and a frame prediction mode. In field prediction, a field is predicted using data of one or more previous decoded fields. In frame prediction, a frame is predicted using data of one or more previous decoded frames. Within a field picture, prediction is performed only by field prediction. On the other hand, for frame pictures, prediction is possible by either field prediction or frame prediction. The prediction mode is selected for each macroblock. In predictive coding of a macroblock, in addition to the field prediction and the frame prediction, 16×8 motion compensation and two special dual prime prediction modes may be used.

Motion vector information and other associated information are coded together with a prediction error signal of each macroblock. A motion vector is coded such that a last motion vector coded into a variable length code is employed as a prediction vector and a difference vector with respect to the prediction vector is coded. The maximum displayable vector length can be programmed for each picture. Calculations of motion vectors are properly performed by a coder.

After picture_data, next sequence_header and sequence_extension are placed. The data elements described in these sequence_header and sequence_extension are exactly the same as those described in sequence_header and sequence_extension at the beginning of the sequence of the video stream. Describing the same data at different locations in the stream in the above-described manner makes it possible to reduce the probability that data in the sequence layer cannot be received successfully and thus the stream cannot be decoded when a receiving apparatus starts to receive the bit stream from a part in the middle of the bit stream.

Finally, after data elements defined by the last sequence_header and sequence_extension, that is, at the end of a data stream, 32-bit sequence_end_code is placed to indicate the end of the sequence.

The respective data elements are described in further detail below with reference to FIGS. 5 to 12.

FIG. 5 illustrates the data structure of sequence_header. sequence_header includes, as data elements, sequence_header_code, horizontal_size_value, vertical_size_value, aspect_ratio_information, frame_rate_code, bit_rate_value, marker_bit, vbv_buffer_size_value, constrained_parameter_flag, load_intra_quantiser_matrix, intra_quantiser_matrix, load_non_intra_quantiser_matrix, and non_intra quantiser_matrix.

sequence_header_code is data serving as a start synchronization code of the sequence layer. horizontal_size_value is data consisting of low-order 12 bits of the value representing the number of pixels in the horizontal direction of a picture. vertical_size_value is data consisting of low-order 12 bits of the value representing the number of lines in the vertical direction of a picture. aspect_ratio_information is data representing the aspect ratio (vertical to horizontal ratio) of a pixel or a screen. frame_rate_code is data representing a rate at which a picture frame is displayed. bit_rate_value is data consisting of low-order 18 bits of the value representing the bit rate which limits the number of bits generated.

marker_bit is bit data inserted to prevent start code emulation. vbv_buffer_size_value is data consisting of low-order 10 bits of the value representing the size of a virtual buffer VBV (Video Buffering Verifier) for controlling the size of a generated code. constrained_parameter_flag is data indicating that respective parameters are within limited ranges. load_non_intra_quantiser_matrix is data indicating that there is quantization matrix data for a non-intra macroblock. load_intra_quantiser_matrix is data indicating that there is quantization matrix data for an intra macroblock. intra_quantiser_matrix is data representing the values of a quantization matrix for an intra macroblock. non_intra_quantiser_matrix is data representing the values of a quantization matrix for a non-intra macroblock.

FIG. 6 illustrates the data structure of sequence_extension. sequence_extension include data elements such as extension_start_code, extension_start_code_identifier, profile_and_level_indication, progressive_sequence, chroma_format, horizontal_size_extension, vertical_size_extension, bit_rate_extension, marker_bit, vbv_buffer_size_extension, low delay, frame_rate_extension_n and frame_rate_extension_d.

extension_start_code is a start synchronization code of extension data. extension_start_code_identifier is data representing the type of extension data. profile_and_level_indication is data specifying a profile and a level of video data. progressive_sequence is data indicating that video data is sequentially scanned (progressive picture). chroma_format is data specifying a color difference format of the video data. horizontal_size_extension is high-order 2-bit data which is added to horizontal_size_value of a sequence header. vertical_size_extension is high-order 2-bit data which is added to vertical_size_value of a sequence header.

bit_rate_extension is high-order 12-bit data which is added to bit_rate_value of the sequence header. marker_bit is bit data inserted to prevent start code emulation. vbv_buffer_size_extension is high-order 8-bit data which is added to vbv_buffer_size_value of the sequence header. low_delay is data indicating that no B picture is included. frame_rate_extension_n is data which is combined with frame_rate_code of the sequence header to obtain a frame rate. frame_rate_extension_d is data which is combined with frame_rate_code of the sequence header to obtain a frame rate.

FIG. 7 illustrates the data structure of GOP_header. GOP_header consists of data elements of group_start_code, time_code, closed_gop, and broken_link.

group_start_code is a start synchronization code of a GOP layer. time_code is a time code representing a time of a first picture of a GOP. closed_gop is flag data indicating that a picture in a GOP can be reproduced independently of the other GOPS. broken_link is flag data indicating that a first B-picture in a GOP cannot be accurately reproduced because of a modification resulting from edition or the like.

FIG. 8 illustrates the data structure of picture_header. Data elements of picture_header include picture_start_code, temporal_reference, picture_coding_type, vbv_delay, full_pel_forward_vector, forward_f_code, full_pel_backward_vector and backward_f_code.

picture_start_code is data serving as a start synchronization code of a picture layer. temporal_reference is data which represent the order in which pictures are displayed and which is reset at the start of a GOP. picture_coding_type is data representing the type of a picture. vbv_delay is data representing an initial state of a virtual buffer in random accessing. full_pel_forward_vector, forward_f_code, full_pel_backward_vector, backward_f_code are fixed data which are not used in the MPEG-2.

FIG. 9 illustrates the data structure of picture_coding_extension. picture_coding_extension includes extension_start_code, extension_start_code_identifier, f_code[0][0], f_code[0][1], f_code[1][0], f_code[1][1], intra_dc_precision, picture_structure, top_field_first, frame_pred_ frame_dct, concealment_motion_vectors, q_scale_type, intra_vlc_format, alternate_scan, repeat_first_field, chroma_420_type, progressive_frame, composite_display_ flag, v_axis, field_sequence, sub_carrier, burst_amplitude and sub_carrier_phase.

extension_start_code is data serving as a synchronization code indicating the start of extension data in a picture layer. extension_start_code_identifier is data representing the type of extension data. f_code[0][0] is data representing the search range of a horizontal motion vector in a forward direction. f_code[0][1] is data representing the search range of a vertical motion vector in a forward direction. f_code[1][0] is data representing the search range of a horizontal motion vector in a backward direction. f_code[1][1] is data representing the search range of a vertical motion vector in a backward direction.

intra_dc_precision is data representing the degree of precision of DC coefficients. If DCT is applied to a matrix f representing luminance and color difference signals of the respective pixels within a block, an 8×8 DCT coefficient matrix F is obtained. A coefficient at the upper left corner of the DCT coefficient matrix F is called a DC coefficient. The DC coefficient is a signal representing the mean luminance and the means color difference of a block. picture_structure is data indicating whether a picture has a frame structure or a field structure. In the case where picture_structure indicates that a picture has the field structure, picture_structure further includes data indicating whether the field is upper or lower one. top_field_first is data representing, when the structure is the frame structure, whether the first field is upper or lower filed. frame_predictive_frame_dct is data used only when the structure is the frame structure to indicate that the frame-mode DCT prediction is performed only in the frame mode. concealment_motion_vectors is data indicating that an intra macroblock includes a motion vector for concealing a transmission error.

q_scale_type is data indicating whether a linear quantization scale or a nonlinear quantization scale is used. intra_vlc_format is data indication whether an intra macroblock uses another 2-dimensional VLC (Variable Length Coding). alternate_scan indicates whether scanning is performed in a zigzag fashion or an alternate fashion. repeat_first_field is data used in 2:3 pulling down. In chroma_420_type, the same value as the next progressive_frame is described when the 4:2:0 color difference format is used, while 0 is described when the color difference format is not 4:2:0. progressive_frame is data indicating whether or not the present picture is sequentially scanned. composite_display_flag is data indicating whether or not a source signal is a composite signal. v_axis, field_sequence, sub_carrier, burst_amplitude, and sub_carrier_phase are used when the source signal is a composite signal.

The data structure of picture_data is described with reference to FIG. 10. function picture_data( ) defines data elements by function slice( ). At least one data element defined by function slice( ) is described in a bit stream.

As shown in FIG. 11, function slice( ) is defined by data elements including slice_start_code, quantiser_scale_code, intra_slice_flag, intra_slice, reserved_bits, extra_bit_slice, and extra_information_slice and also by function macroblock( ).

slice_start_code is a start code indicating the start of a data element defined by function slice( ). quantiser_scale_code is data indicating the quantization step size set for a macroblock existing in the present slice layer. When quantiser_scale_code is set for each macroblock higher priority is given to macroblock_quantiser_scale_code which is set for each macroblock.

intra_slice_flag is a flag indicating whether a bit stream includes intra_slice and reserved_bits. intra_slice is data indicating whether or not there is a non-intra macroblock in the slice layer. When any one of macroblocks in the slice layer is a non-intra macroblock, intra_slice is set to "0". In the case where all macroblocks in the slice layer are intra macroblocks, intra_slice is set to "1". reserved_bits is a 7-bit reserved data area. extra_bit_slice is a flag indicating whether or not there is extra information. When there is extra_information_slice, extra_bit_slice is set to "1", while extra_bit_slice is set to "0" when there is no extra information.

Following the above data elements, data elements defined by function macroblock( ) are described. As shown in FIG. 12, function macroblock( ) is used to describe data elements such as macroblock_escape, macroblock_address_increment, quantiser_scale_code, and marker_bit and also to describe data elements defined by function macroblock_modes( ), function motion_vectors( ), and function coded_block_pattern( ).

macroblock_escape is a fixed bit string indicating whether or not the difference in the horizontal direction between a reference macroblock and a previous macroblock is equal to or greater than 34. When the difference in the horizontal direction between the reference macroblock and the previous macroblock is equal to or greater than 34, 33 is added to the value of macroblock_address_increment. macroblock_address_increment is data indicating the difference in the horizontal direction between a reference macroblock and a previous macroblock. For example, if there is one macroblock_escape before macroblock_address_increment, the value obtained by adding 33 to macroblock_address_increment indicates the actual difference in the horizontal direction between the reference macroblock and the previous macroblock.

quantiser_scale_code is data indicating the quantization step size set for each macroblock. Quantiser_scale_code is described only when macroblock_quant is equal to "1". slice_quantiser_scale_code is set for each slice layer to indicate the quantization step size of the slice layer. However, when scale_code is set for a reference macroblock, quantiser_scale_code is selected.

After macroblock_address_increment, data elements defined by function macroblock_modes( ) are described. As shown in FIG. 13, function macroblock_modes( ) is used to describe data elements such as macroblock_type, frame_motion_type, field_motion_type, and dct_type. macroblock_ type is data indicating the coding type of a macroblock.

If macroblock_motion_forward or macroblock_motion_backward is equal to "1" and if the picture structure is a frame and furthermore if frame_pred_frame_dct is equal to "0", a data element representing frame_motion_type is described after a data element representing macroblock_type. frame_pred_frame_dct is a flag indicating whether or not the bit stream includes frame_motion_type.

frame_motion_type is a 2-bit code indicating the prediction type of a macroblock in a frame. In the case where there are two prediction vectors and the prediction is on a field basis, frame_motion_type is set to "00". In the case where there is one prediction vector and the prediction is on the field basis, frame_motion_type is set to "01". When there is one prediction vector and the prediction is on the basis of frame, frame_motion_type is set to "10". In the case where there is one prediction vector and the prediction is on a dual prime basis, frame_motion_type is set to "11".

field_motion_type is a 2-bit code indicating the motion prediction type of a macroblock in a field. In the case where there is one prediction vector and the prediction is on the basis of field, field_motion_type is set to "01". When there are two prediction vectors and the prediction is on the basis of 18×8 macroblocks, field_motion_type is set to "10". In the case where there is one prediction vector and the prediction is on a dual prime basis, field_motion_type is set to "11".

If the picture structure is a frame and if frame_pred_frame_dct indicates that a bit stream includes frame_motion_type and furthermore if frame_pred_frame_dct indicates that the bit stream includes dct_type, a data element representing dct_type is described after the data element representing macroblock_type. dct_type is data indicating whether DCT is in the frame DCT mode or the field DCT mode.

Each of data elements in an MPEG-2 video bit stream starts with a special bit pattern called a start code. Each start code has a specific bit pattern which is never used in a bit pattern for any other purposes. Each start code consists of a start code prefix and a start code value following the start code prefix. The start code prefix is a bit string of "0000 0000 0000 0000 0000 0001". The start code value is described in 8 bits to indicate the type of the start code.

FIG. 14 shows the start code values according to the MPEG-2 standard. Most start codes have one start code value. However, slice_start_code includes a plurality of start code values (01 to AF) to indicate the vertical position of a slice. All these start codes are described in units of bytes. Therefore, a plurality of bits of "0" are placed before the start code prefix so that the first bit of the start code prefix becomes the first bit of a byte and thus the start code is described in units of bytes.

A conventional MPEG video decoder capable of coding MP@ML/MPEG-2 video bit streams is described below with reference to FIG. 15. FIG. 15 illustrates an example of a construction of such a type of MPEG video decoder.

This MPEG video decoder includes an IC (Integrated Circuit) 1 and a buffer 12 formed of a DRAM (Dynamic Random Access Memory) or the like, wherein the buffer 2 includes a stream buffer 21 and a video buffer 22, and the IC 1 includes a stream input circuit 11, a buffer control circuit 12, a clock generator 13, a start code detection circuit 14, a decoder 15, a motion compensation circuit 16, and a display signal output circuit 17.

The stream input circuit 11 in the IC 1 receives a high-efficiency coded stream (MP@ML/MPEG-2 video bit stream) and supplies it to the buffer control circuit 12. In response to a basic clock supplied from the clock generator 13, the stream buffer control circuit 12 writes the received coded stream into the stream buffer 21 in the buffer 2. The stream buffer 21 has a storage capacity equal to or greater than 1, 835, 008 needed as the VBV buffer size to decode an MP@ML stream. The coded stream stored in the stream buffer 21 is read in a first-in first-out fashion under the control of the buffer control circuit 12 and supplied to the start code detection circuit 14. The start code detection circuit 42 detects a start code described above with reference to FIG. 14 and outputs the detected start code and the input stream to the decoder 15.

The decoder 15 decodes the input stream in accordance with the MPEG syntax. First, the decoder 15 decodes a header parameter in a picture layer in accordance with the input start code. On the basis of the decoded header parameter, the decoder 15 divides the slice layer into macroblocks and decodes the macroblocks. A prediction vector and pixel data obtained as a result of the decoding are output to the motion compensation circuit 16.

In the technique of coding data into a compressed form according to the MPEG standard, the coding efficiency is improved by using a difference representing motion compensation between adjacent pictures on the basis of temporal redundancy among the adjacent pictures. In this MPEG video decoder, for pixels coded using motion compensation, picture data of a reference picture indicated by the motion vector is added to pixel data to be decoded thereby performing motion compensation and thus decoding the pixel data into original picture data.

In the case where a macroblock output from the decoder 15 does not need motion compensation, the motion compensation circuit 16 writes the pixel data into the video buffer 22 of the buffer 2 via the buffer control circuit 12 in preparation for outputting display data and also for future use as reference data for another picture.

When a macroblock output from the decoder 15 needs motion compensation, the motion compensation circuit 16 reads reference pixel data from the video buffer 22 in the buffer 2 via the buffer control circuit 12 in accordance with the prediction vector output from the decoder 15. The obtained reference pixel data is added to the pixel data supplied from the decoder 15 thereby performing motion compensation. The motion compensation circuit 16 writes the resultant pixel data into the video buffer 22 in the buffer 2 via the buffer control circuit 12 in preparation for outputting display data and also for future use as reference data for another picture.

The display signal output circuit 17 generates a synchronization timing signal used in outputting decoded picture data. In accordance with the timing signal, the display signal output circuit 17 reads pixel data from the video buffer 22 via the buffer control circuit 12 and outputs it as a decoded video signal.

As described above, an MPEG-2 stream has a hierarchical structure. The data sizes of data, from sequence_header to picture_coding_extension in a picture layer described above with reference to FIG. 3, do not depend upon the classes having various profiles and levels described above with reference to FIG. 2. However, the data sizes of data in the slice layer and in lower layers depend upon the number of pixels to be coded.

In HL, as can be understood from FIG. 2, the number of macroblocks which are needed to be processed for one picture is about 6 times greater than needed in ML. In the case of 4:2:2P, as can be seen from FIG. 4, the number of blocks which are needed to be processed in each macroblock is 4/3 times that needed in MP.

Therefore, when a 4:2:2P@HL coded stream is decoded using the conventional MPEG video decoder designed to decode MP@ML streams shown in FIG. 15, the buffer size of the stream buffer 21 becomes insufficient because of the increases in the VBV buffer size and the number of pixels. Furthermore, the increase in the bit rate results in an increase in frequency of accessing to the stream buffer 21 to store an input stream, and the increase in the number of pixels results in an increase in frequency of accessing of the motion compensation circuit 16 to the video buffer 22. As a result, the buffer control circuit 12 becomes necessary to operate at a higher speed. Furthermore, because of the increase in the bit rate and the increases in the numbers of macroblocks and blocks, the decoder 15 becomes necessary to operate at a higher speed.

In general, when signal processing is performed at an increased speed, the result is a great increase in the circuit scale, an increase in the number of components, and an increase in power consumption. Therefore, although recent advancements in the semiconductor technology have made it possible to greatly increase the speed of signal processing circuits and memory (buffer) circuits and to reduce the circuit size, it is still difficult to realize a video decoder with a realistic circuit scale capable of decoding 4:2:2P@HL streams in real time using the conventional technique for decoding MP@HL streams.

When it is desired to reproduce an MP@ML coded stream at a high speed increased by a factor greater than 1 using the conventional MPEG video decoder designed to decode MP@ML streams shown in FIG. 15, one possible technique is to partly extract pictures from given MP@ML coded stream and input the extracted pictures to the MPEG video decoder.

However, in the MPEG coding, as described above with reference to FIG. 1, predictive coding is performed using adjacent pictures as reference pictures. Therefore, if pictures are partly extracted in an arbitrary fashion, it becomes impossible to decode some pictures. For example, as shown in FIG. 16, if picture $P_{10}$ is not included in the extracted pictures, it becomes impossible to decode pictures $B_8$, $B_9$, $B_{11}$, and $B_{12}$ which need picture $P_{10}$ as a reference picture.

FIG. 17 shows a technique to avoid the above problem. In this technique, extraction is performed such that I pictures and P pictures which are used as reference pictures by other pictures are included in a set of extracted pictures and such that only B pictures which are not used as reference pictures by other pictures are allowed to be discarded and input the resultant MP@ML coded stream including the extracted pictures to the MPEG video decoder. However, in this technique, in order to discard only B pictures, it is necessary to provide a function of detecting B pictures and discarding them. Besides, because only B pictures are discarded, the playback speed of the extracted coded stream becomes a particular value determined by the locations of I pictures, P pictures, and B pictures.

Furthermore, although the playback speed can be set to an arbitrary value by displaying I and P pictures repeatedly as many times as required, the motion of a displayed image becomes jerky.

Another problem of the conventional MPEG video decoder is that a plurality of coded streams, which are input at the same time or which are included in a multi-channel multiplexed stream (transport stream) on which a plurality of channels of coded streams (elementary streams) supplied via DVB are multiplexed, cannot be decoded at the same time to output all of the plurality of channels of decoded video signals at the same time or to output a selected one of the decoded video signals.

In view of the above, it is an object of the present invention to provide a video decoder capable of reproducing a 4:2:2P@HL coded stream in real time and also capable of reproducing an MP@ML coded stream at a high speed, using a circuit with a realistic scale.

It is another object of the present invention to provide a video decoder capable of decoding a plurality of channels of coded streams in parallel.

SUMMARY OF THE INVENTION

A first decoding apparatus according to the present invention comprises input means for inputting a speeded-up coded stream; a plurality of decoding means for decoding the speeded-up coded stream; decoding control means for controlling the plurality of decoding means such that the plurality of decoding means operate in parallel; and output control means for outputting, at an arbitrary playback speed, a picture corresponding to the speeded-up coded stream decoded by the plurality of decoding means.

The speeded-up coded stream may be an MPEG-2 video bit stream having a bit rate increased by a predetermined factor.

The output control means may output a picture corresponding to the MPEG-2 video bit stream having the bit rate increased by the predetermined factor, at a playback speed increased by a factor within the range from zero to a predetermined value.

The decoding means may output a signal indicating completion of decoding to the decoding control means, and the decoding control means may control the decoding means which has output the signal indicating the completion of decoding such that the decoding means decodes another coded stream.

The first decoding apparatus may further comprise first buffer means for buffering the coded stream; reading means for reading from the coded stream a start code indicating the start of a predetermined unit of information included in the coded stream and further reading position information indicating a location in the buffer means at which the start code is stored; second buffering means for buffering the start code and the position information read by the reading means; and buffering control means for controlling buffering of the coded stream by the first buffering means and buffering of the start code and the position information by the second buffering means.

The first decoding means according to the present invention may further comprise selection means for selecting a particular one of a plurality of picture data decoded and output by the plurality of decoding means; and compensation means which receives the picture data selected by the selection means and performs motion compensation, as required, upon the received picture data.

The plurality of decoding means may output an end signal indicating completion of decoding to the selection means, and the selection means may include storage means for storing a value corresponding to a processing state of each of the plurality of decoding means. The selection means may operate such that when values stored in the storage means all become equal to a first value, a value stored therein corresponding to decoding means outputting the end signal indicating completion of decoding is changed from the first value to a second value, one of picture data decoded by the first decoding means corresponding to the second value stored in the storage means is selected, and the values, stored in the storage means, corresponding to the decoding means which has decoded the selected picture data is changed to the first value.

The decoding apparatus according to the present invention may further comprise storage means for storing the picture data selected by the selection means or the picture data subjected to motion compensation performed by the motion compensation means; and storage control means for controlling the storage, in the storage means, of the picture data selected by the selection means or the picture data subjected to motion compensation performed by the motion compensation means.

The storage means may store a luminance component and a color difference component of the picture data separately from each other.

A first decoding method according to the present invention comprises an inputting step of inputting a speeded-up coded stream; a plurality of decoding steps of decoding the speeded-up coded stream; a decoding control step of controlling the plurality of decoding steps such that the plurality of decoding steps are performed in parallel; and an output control step of outputting, at an arbitrary playback speed, an image corresponding to the speeded-up coded stream decoded in the plurality of decoding steps.

A first storage medium according to the present invention includes a program stored thereon wherein the program comprises an inputting step of inputting a speeded-up coded stream; a plurality of decoding steps of decoding the speeded-up coded stream; a decoding control step of controlling the plurality of decoding steps such that the plurality of decoding steps are performed in parallel; and an output control step of outputting, at an arbitrary playback speed, an image corresponding to the speeded-up coded stream decoded in the plurality of decoding steps.

A second decoding apparatus according to the present invention comprises input means for inputting a speeded-up coded stream; slice decoder control means for controlling a plurality of slice decoders such that the plurality of slice decoders operate in parallel; and output control means for outputting, at an arbitrary playback speed, a picture corresponding to the speeded-up coded stream decoded by the plurality of slice decoders.

A second decoding method according to the present invention comprises an inputting step of inputting a speeded-up coded stream; a slice decoder control step of controlling a plurality of slice decoders such that the plurality of slice decoders operate in parallel; and an output control step of outputting, at an arbitrary playback speed, a picture corresponding to the speeded-up coded stream decoded by the plurality of slice decoders.

A second storage medium according to the present invention includes a program stored thereon wherein the program comprises an inputting step of inputting a speeded-up coded stream; a slice decoder control step of controlling a plurality of slice decoders such that the plurality of slice decoders operate in parallel; and an output control step of outputting, at an arbitrary playback speed, a picture corresponding to the speeded-up coded stream decoded by the plurality of slice decoders.

A third decoding apparatus according to the present invention includes an inputting step of inputting a plurality of coded streams; a plurality of decoding steps of decoding the plurality of coded streams; decoding control means for controlling the plurality of decoding means such that the plurality of decoding means operate in parallel; and output control means for outputting a plurality of pictures corresponding to the plurality of coded streams decoded by the plurality of decoding means.

The coded stream may be an MPEG-2 video bit stream.

The decoding means may output a signal indicating completion of decoding to the decoding control means, and the decoding control means may control the decoding means which has output the signal indicating the completion of decoding such that the decoding means decodes another coded stream.

The third decoding apparatus may further comprise first buffer means for buffering the coded stream; reading means for reading from the coded stream a start code indicating the start of a predetermined unit of information included in the coded stream and further reading position information indicating a location in the buffer means at which the start code is stored; second buffering means for buffering the start code and the position information read by the reading means; and buffering control means for controlling buffering of the coded stream by the first buffering means and buffering of the start code and the position information by the second buffering means.

The third decoding means according to the present invention may further comprise selection means for selecting a particular one of a plurality of picture data decoded and output by the plurality of decoding means; and compensation means which receives the picture data selected by the selection means and performs motion compensation, as required, upon the received picture data.

The plurality of decoding means may output an end signal indicating completion of decoding to the selection means, and the selection means may include storage means for storing a value corresponding to a processing state of each of the plurality of decoding means such that when values stored in the storage means all become equal to a first value, a value stored therein corresponding to decoding means outputting the end signal indicating completion of decoding is changed from the first value to a second value, one of picture data decoded by the first decoding means corresponding to the second value stored in the storage means is selected, and the values, stored in the storage means, corresponding to the decoding means which has decoded the selected picture data is changed to the first value.

The third decoding apparatus according to the present invention may further comprise storage means for storing the picture data selected by the selection means or the picture data subjected to motion compensation performed by the motion compensation means; and storage control means for controlling the storage, in the storage means, of the picture data selected by the selection means or the picture data subjected to motion compensation performed by the motion compensation means.

The storage means may store a luminance component and a color difference component of the picture data separately from each other.

The third decoding apparatus according to the present invention may further comprise acceptance means for accepting a multiplexed stream on which the plurality of coded streams are multiplexed; and supply means for separating the multiplexed stream into the plurality of coded streams and supplying the plurality of coded streams to the input means.

A third decoding method according to the present invention comprises an inputting step of inputting a plurality of coded streams; a plurality of decoding steps of decoding the plurality of coded streams; a decoding control step of controlling the plurality of decoding steps such that the plurality of decoding steps are performed in parallel; and an output control step of outputting a plurality of pictures corresponding to the plurality of coded streams decoded in the plurality of decoding steps.

A third storage medium according to the present invention includes a program stored thereon wherein the program comprises an inputting step of inputting a plurality of coded streams; a plurality of decoding steps of decoding the plurality of coded streams; a decoding control step of controlling the plurality of decoding steps such that the plurality of decoding steps are performed in parallel; and an output control step of outputting a plurality of pictures corresponding to the plurality of coded streams decoded in the plurality of decoding steps.

A fourth decoding apparatus according to the present invention comprises an inputting step of inputting a plurality of coded streams; slice decoder control means for controlling a plurality of slice decoders such that the plurality of slice decoders operate in parallel; and output control means for outputting a plurality of pictures corresponding to the plurality of coded streams decoded by the plurality of slice decoders.

A fourth decoding method according to the present invention comprises an inputting step of inputting a plurality of coded streams; a slice decoder control step of controlling a plurality of slice decoders such that the plurality of slice decoders operate in parallel; and an output control step of outputting a plurality of pictures corresponding to the plurality of coded streams decoded by the plurality of slice decoders.

A fourth storage medium according to the present invention includes a program stored thereon wherein the program comprises an inputting step of inputting a plurality of coded streams; a slice decoder control step of controlling a plurality of slice decoders such that the plurality of slice decoders operate in parallel; and an output control step of outputting a plurality of pictures corresponding to the plurality of coded streams decoded by the plurality of slice decoders.

In the first decoding apparatus, the first decoding method, and the program stored on the first storage medium, a speeded-up coded stream is input and decoded in a parallel fashion. A picture corresponding to the decoded speeded-up coded stream is output at an arbitrary playback speed.

In the second decoding apparatus, the second decoding method, and the program stored on the second storage medium, a speeded-up coded stream is input and decoded in a parallel fashion using a plurality of slice decoders. A picture corresponding to the speeded-up coded stream decoded by the plurality of slice decoders is output at an arbitrary playback speed.

In the third decoding apparatus, the third decoding method, and the program stored on the third storage medium, a plurality of coded streams are input and decoded in a parallel fashion, and a plurality of pictures corresponding to the plurality of coded streams decoded in the above described manner are output.

In the fourth decoding apparatus, the fourth decoding method, and the program stored on the fourth storage medium, a plurality of coded streams are input and decoded in a parallel fashion by a plurality of slice decoders, a plurality of pictures corresponding to the plurality of coded streams decoded by the plurality of slice decodes are output.

BRIEF DESCRIPTION OF THE DRAWINGS

FIG. 2 is a table illustrating upper limits of parameters for respective profiles and levels defined in the MPEG-2 standard;

FIG. 5 is a table illustrating a data structure of sequence_header;

FIG. 6 is a table illustrating a data structure of sequence_extension;

FIG. 7 is a table illustrating a data structure of GOP_header;

FIG. 8 is a table illustrating a data structure of picture_header;

FIG. 9 is a table illustrating a data structure of picture_coding_extension;

FIG. 10 is a table illustrating a data structure of picture_data;

FIG. 11 is a table illustrating a data structure of a slice;

FIG. 12 is a table illustrating a data structure of a macroblock;

FIG. 13 is a table illustrating a data structure of macroblock_modes;

FIG. 14 is a table illustrating a start code;

FIG. 29 is a diagram illustrating an example of an application of the MPEG video decoder.

DESCRIPTION OF THE PREFERRED EMBODIMENTS

Figure 1:
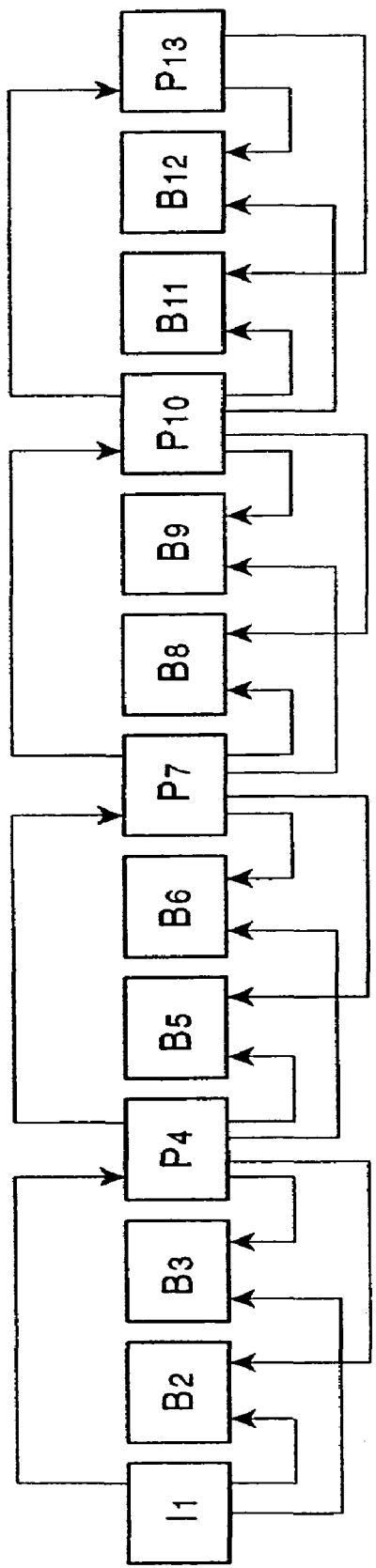
FIG. 1 is a schematic diagram illustrating picture types used in the MPEG technique.

A first example of a construction of an MPEG video decoder according to the present invention is described below with reference to FIG. 18.

The MPEG video decoder 40 includes an IC 31 including a stream input circuit 41, a start code detection circuit 42, a stream buffer control circuit 43, a clock generator 44, a picture decoder 45, a slice decoder control circuit 46, slice decoders 47 to 49, a motion compensation circuit 50, a luminance buffer control circuit 51, a color difference buffer control circuit 52, and a display signal output circuit 53. The MPEG video decoder 40 also includes a buffer 32 formed of a DRAM or the like including a stream buffer 61 and a start coder buffer 62, a luminance buffer 72 formed of a DRAM or the like, a color difference buffer 72 formed of a DRAM or the like, a controller 34 including a CPU (Central Processing Unit) or the like, and a drive 35.

The stream input circuit 41 receives a high-efficiency coded stream (MPEG-2 video bit stream) and supplies it to the start code detection circuit 42. The start code detection circuit 42 supplies the received coded stream to the stream buffer control circuit 43. The start code detection circuit 42 also detects a start code described earlier with reference to FIG. 14 and generates, on the basis of the detected start code, start code information including data indicating the type of the start code and a write pointer indicating a location at which the start code is to be written. The generated start code information is supplied to the stream buffer control circuit 43.

Figure 16:
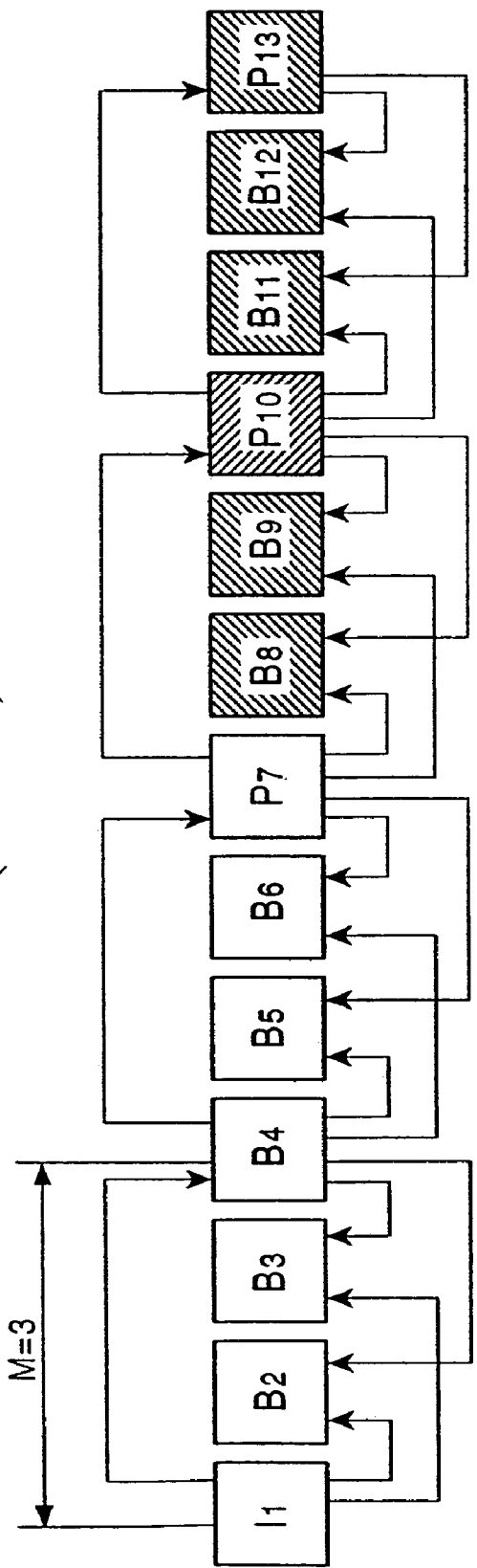
FIG. 16 is a diagram illustrating a problem which occurs when a P-picture is discarded from a coded stream.
Figure 17:
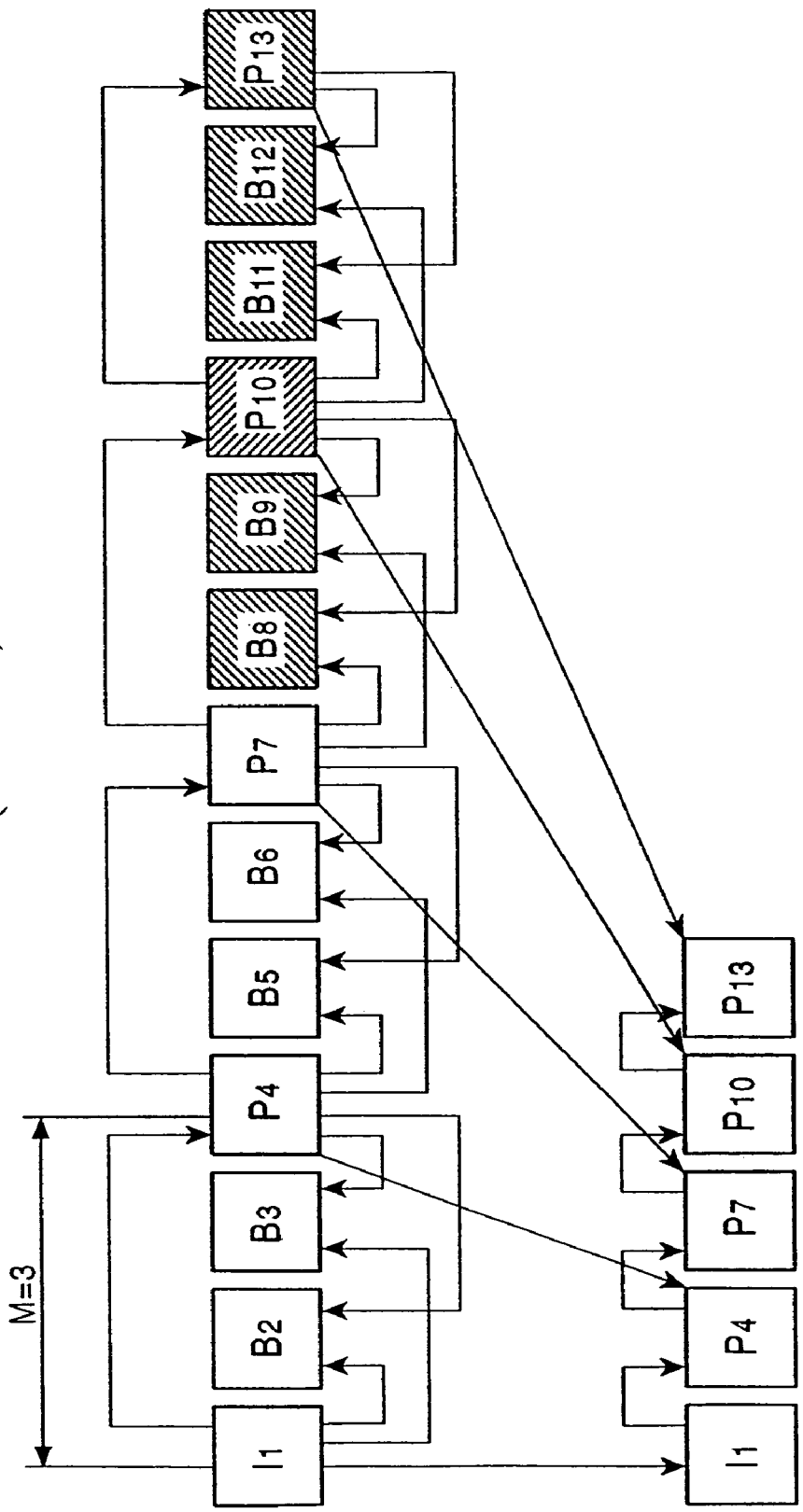
FIG. 17 is a diagram illustrating a problem which occurs when only B-pictures are discarded from a coded stream.

A clock generator 44 generates a basic clock having a repetition period twice that of a clock generator 13 described above with reference to FIG. 16 and supplies it to a stream buffer controller 43. In response to a basic clock supplied from the clock generator 44, the stream buffer control circuit 43 writes the received coded stream into the stream buffer 61 in the buffer 32 and writes the received start code information into the start code buffer 62 in the buffer 32. The stream buffer 61 has a storage capacity equal to or greater than 47, 185, 920 needed as the VBV buffer size to decode an 4:2:2P@HL stream.

Figure 3:
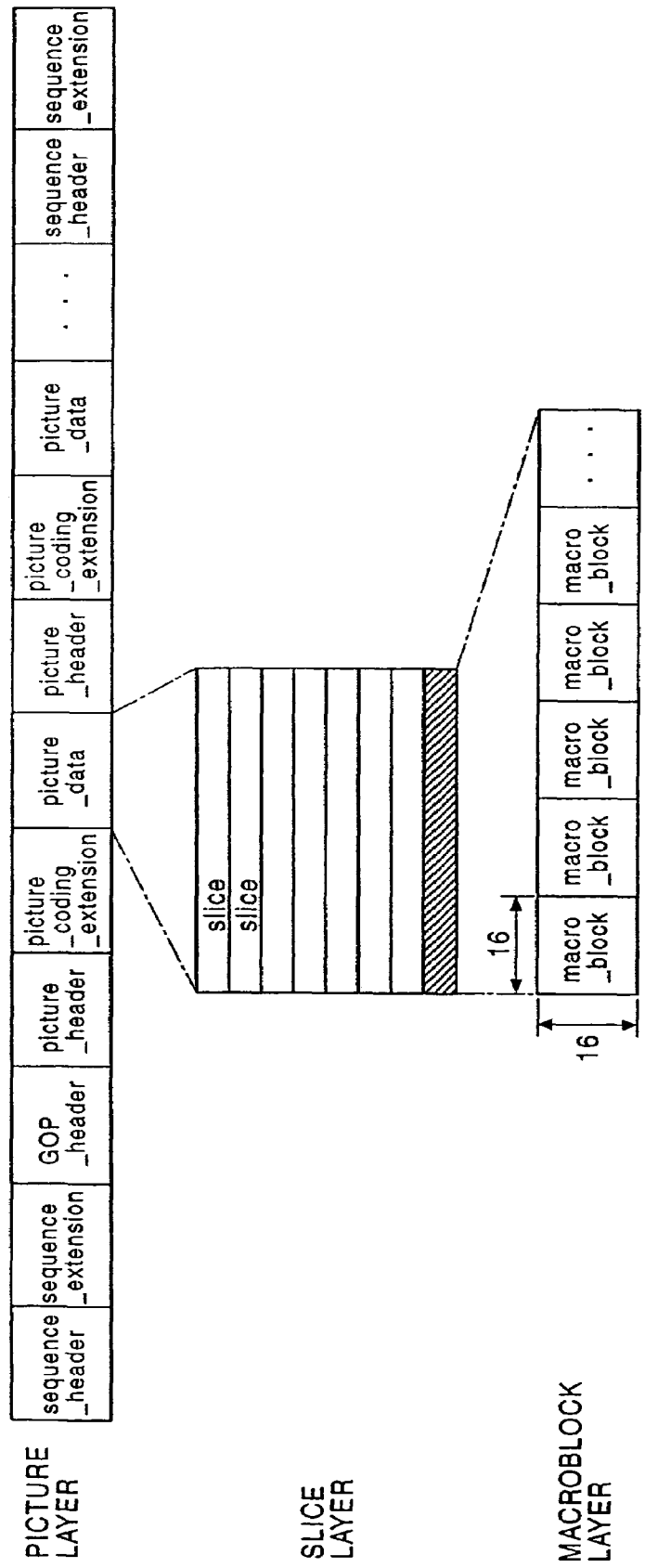
FIG. 3 is a schematic diagram illustrating a hierarchical structure of an MPEG-2 bit stream.
Figure 4A:
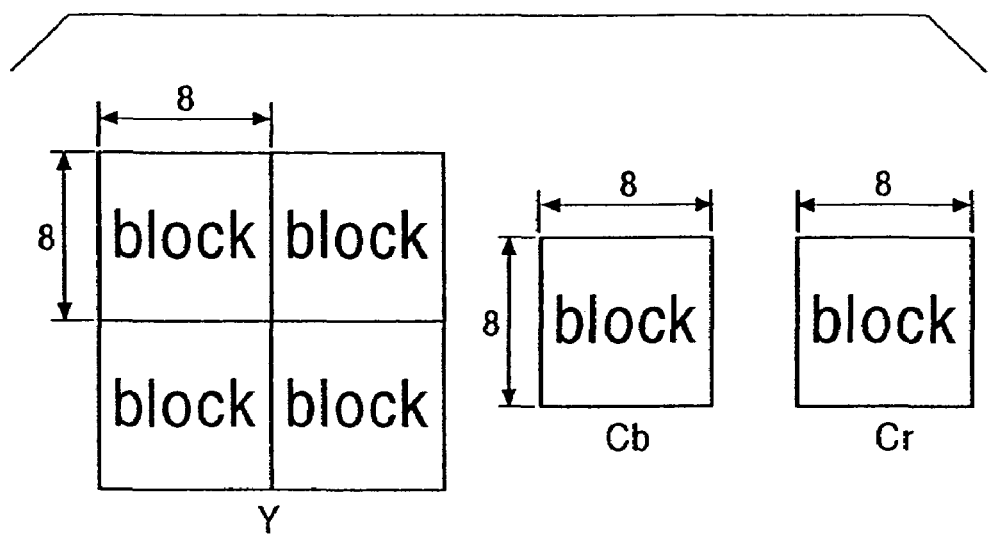
FIG. 4 is a schematic diagram illustrating a macroblock layer.
Figure 4B:
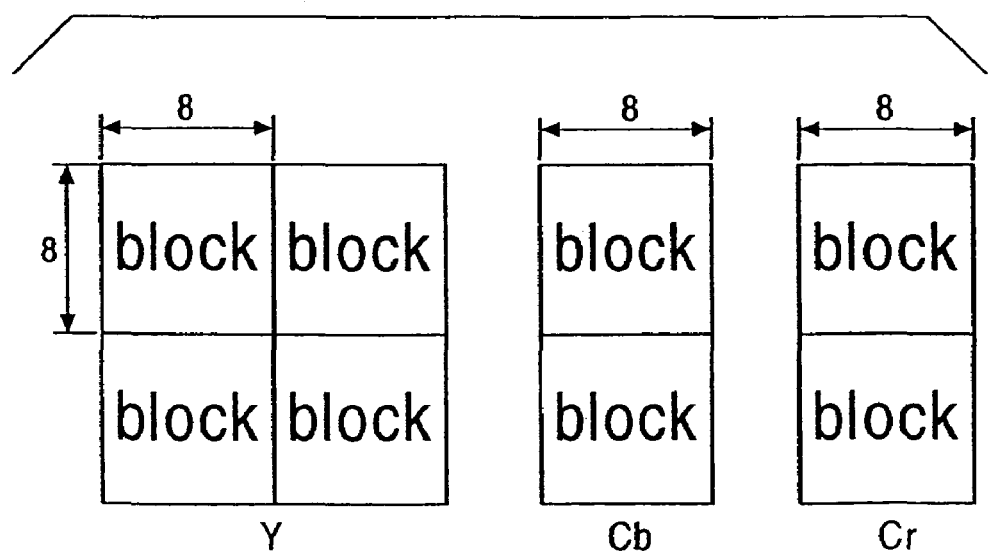

The picture decoder 45 reads the start code information from the start code buffer 62 via the stream buffer control circuit 43. For example, the decoding is started from sequence_header described earlier with reference to FIG. 3. Thus, the picture decoder 45 reads, from the start code buffer 62, a write pointer corresponding to sequence_header_code serving as the start code described earlier with reference to FIG. 5, reads sequence_header from the stream buffer 61 in accordance with the write pointer, and decodes it. Thereafter, the picture decoder 45 reads sequence_extension, GOP_header and picture_coding_extension from the stream buffer 61 and decodes them in a similar manner to sequence_header.

When the picture decoder 45 has read first slice_start_code from the start code buffer 62, all parameters necessary for decoding of a picture have been acquired. The picture decoder 45 outputs the decoded parameters associated with the picture layer to the slice decoder control circuit 46.

Upon reception of the parameters associated with the picture layer, the slice decoder control circuit 46 detects the class (such as 4:2:2@ML or MP@ML) of the coded stream. Furthermore, in accordance with the received parameters of the picture layer, the slice decoder control circuit 46 reads corresponding start code information from the start code buffer 62 via the stream buffer control circuit 43. The slice decoder control circuit 46 includes a register for indicating which one of slices in the coded stream should be decoded by one of the slice decoders 47 to 49. In accordance with the data stored in the register, the slice decoder control circuit 46 supplies the write pointer of the slice included in the start code information to corresponding one of the slice decoders 47 to 49. The process performed by the slice decoder control circuit 46 to select one slice decoder to be used for decoding from the slice decoders 47 to 49 will be described later with reference to FIGS. 19 and 20.

The slice decoder 47 includes a macroblock detection circuit 81, a vector decoder 82, a dequantization circuit 83, and an inverse DCT circuit 84. In accordance with a write pointer received from the slice decoder control circuit 46, the slice decoder 47 reads a corresponding slice from the stream buffer 61 via the stream buffer control circuit 43. Furthermore, in accordance with parameters associated with the picture layer received from the slice decoder control circuit 46, the slice decoder 47 decodes the slice read from the stream buffer 61 and outputs the decoded slice to the motion compensation circuit 50.

The macroblock detection circuit 81 separates macroblocks in the slice layer and decodes parameters of the respective macroblocks. The prediction mode of each variable-length-coded macroblock and the prediction vector are supplied to the vector decoder 82, and the variable-length-coded coefficient data is supplied to the dequantization circuit 83. The vector decoder 82 decodes the variable-length-coded prediction mode and prediction vector thereby reproducing the prediction vector. The dequantization circuit 83 decodes the variable-length-coded coefficient data and supplies the resultant decoded coefficient data to the inverse DCT circuit 84. The inverse DCT circuit 84 performs inverse DCT upon the decoded coefficient data thereby reproducing original pixel data.

Figure 18:
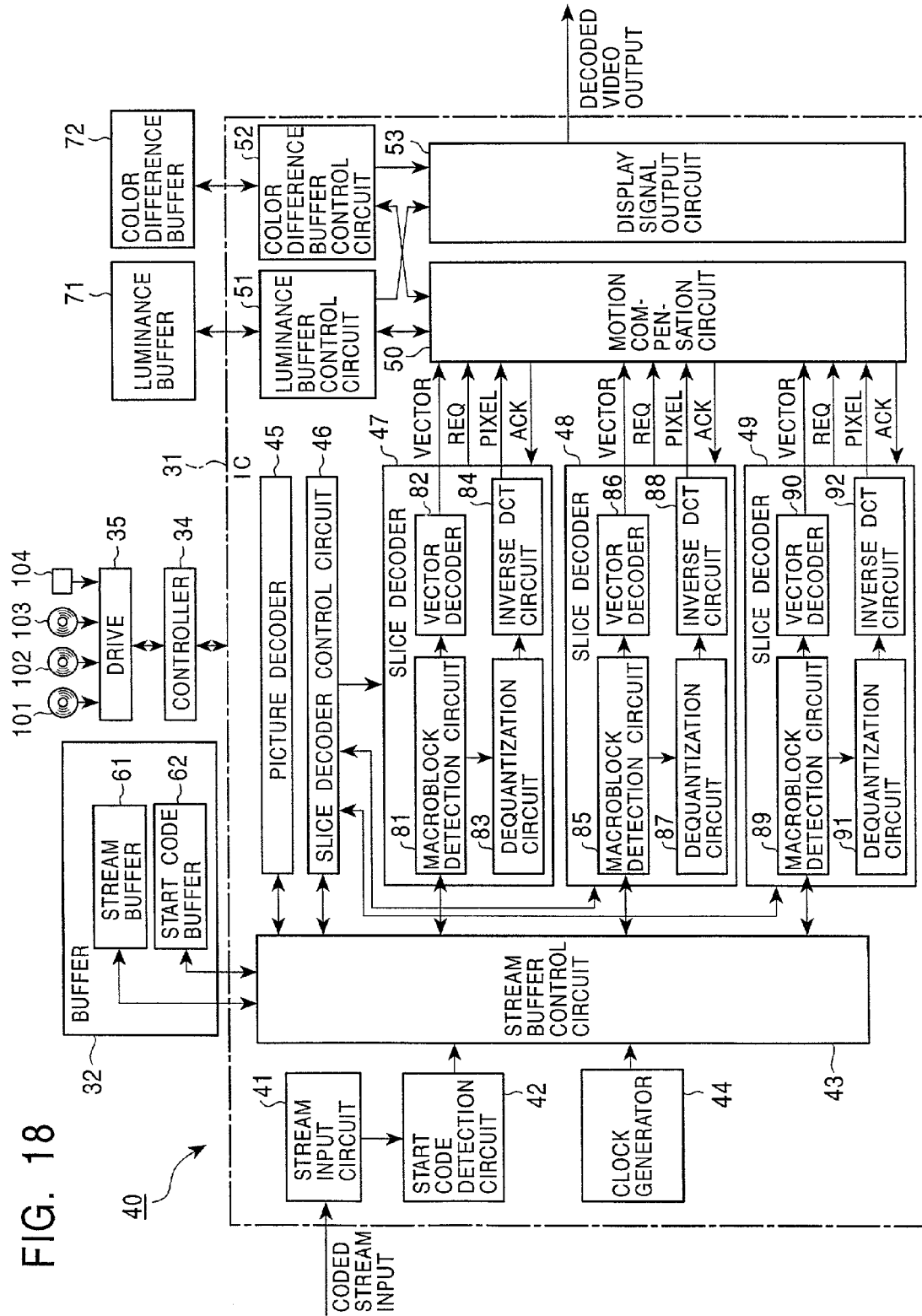
FIG. 18 is a block diagram illustrating an example of a construction of an MPEG video decoder according to the present invention.

The slice decoder 47 requests the motion compensation circuit 50 to perform motion compensation upon the decoded macroblock (by changing the level of REQ shown in FIG. 18 to "1"). If a signal (ACK in FIG. 18) indicating acceptance of the request for the motion compensation is received from the motion compensation circuit 50, the slice decoder 47 supplies the decoded prediction vector and the decoded pixel data to the motion compensation circuit 50. After supplying the decoded prediction vector and the decoded pixel data to the motion compensation circuit 50 in response to the ACK signal, the slice decoder 47 changes the level of the REQ signal from "1" to "0". Thereafter, the slice decoder 47 decodes a following macroblock and again changes the level of the REQ signal from "0" to "1" when the decoding is completed.

The slice decoder 48 including circuit components such as the macroblock detection circuit 85 to the inverse DCT circuit 88 and also the slice decoder 49 including circuit components such as the macroblock detection circuit 89 to the inverse DCT circuit 92 operate in a similar manner to the slice decoder 47 including circuit components such as the macroblock detection circuit 81 and the inverse DCT circuit 84, and thus they are not described in further detail herein.

The motion compensation circuit 50 includes three registers Reg_REQ_A, Reg_REQ_B, and Reg_REQ_C indicating whether motion compensation for data input from the respective slice decoders 47 to 40 is completed. The motion compensation circuit 50 checks the values of these registers and selects one of the slice decoders 47 to 49 depending upon the values of the registers. When the motion compensation circuit 50 accepts a motion compensation request (that is, when a REQ signal is received, the motion compensation circuit 50 outputs an ACK signal to receive a prediction vector and pixel data), the motion compensation circuit 50 performs motion compensation using the selected slice decoder. In the above operation, the motion compensation circuit 50 accepts a next request for motion compensation after all slice decoders 47 to 49 have completed the motion compensation one time in response to a "1"-level REQ signal. For example, when the slice decoder 47 issues a next motion compensation request after a previous motion compensation request, the motion compensation circuit 50 does not accept the next motion compensation request until the motion compensation being performed by the slice decoder 48 and the slice decoder 49 is completed. The manner in which the motion compensation circuit 50 selects an output of one of the slice decoders 47 to 49 to be subjected to motion compensation will be described later with reference to FIGS. 21 and 22.

In the case where a macroblock received from one of the slice decoders 47 to 49 does not need motion compensation, if the pixel data of the macroblock is luminance data, the motion compensation circuit 50 writes the luminance data into the luminance buffer 71 via the luminance buffer control circuit 51, while if the pixel data is color difference data, the motion compensation circuit 50 writes the color difference data into the color difference buffer 72 via the color difference buffer control circuit 52 in preparation for outputting display data and also for future use as reference data for another picture data.

On the other hand, in the case where a macroblock output from one of the slice decoders 47 to 49 needs motion compensation, in accordance with a prediction vector received from corresponding one of the slice decoders 47 to 49, the motion compensation circuit 50 reads reference pixel data wherein the reference pixel data is read from the luminance buffer 71 via the luminance buffer control circuit 51 if the pixel data is luminance data, while the reference pixel data is read from the color difference buffer 72 via the color difference buffer control circuit 52 if the pixel data is color difference data. The motion compensation circuit 50 adds the obtained reference pixel data to the pixel data supplied from one of the slice decoders 47 to 49 thereby performing motion compensation.

After completion of the motion compensation, the motion compensation circuit 50 writes the resultant pixel data to the luminance buffer 71 via the luminance buffer control circuit 51 if the pixel data is luminance data or to the color difference buffer 72 via the color difference buffer control circuit 52 if the pixel data is color difference data in preparation for outputting display data and also for future use as reference data for another pixel data.

The display signal output circuit 53 generates a synchronization timing signal used in outputting of decoded picture data. In accordance with the timing signal, the display signal output circuit 53 reads luminance data from the luminance buffer 71 via the luminance buffer control circuit 51 and also reads color difference data from the color difference buffer 72 via the color difference buffer control circuit 52, and the display signal output circuit 53 outputs them as a decoded video signal.

The drive 35 connected to the controller 34 is used to read and write data from or to a magnetic disk 101, an optical disk 102, a magnetooptical disk 103, or a semiconductor memory 104, which is loaded on the drive as required. The controller 34 is responsible for controlling the operations of the IC 31 and the drive 35 described above. More specifically, the controller 34 controls the operation of the IC 31 in accordance with a program stored on, for example, the magnetic disk 101, the optical disk 102, the magnetooptical disk 103, or the semiconductor memory 104 loaded on the drive 35.

Figure 19:
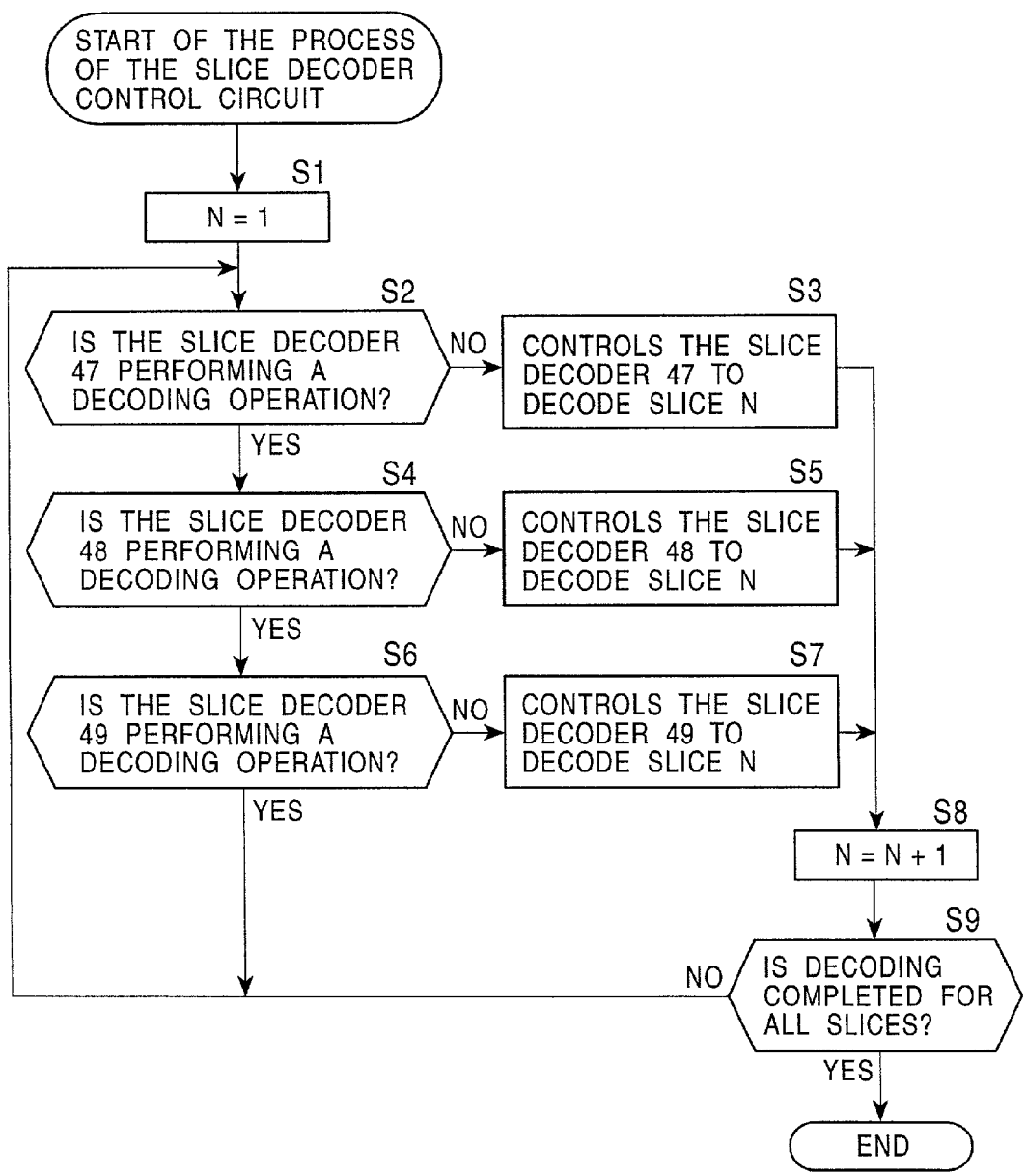
FIG. 19 is a flow chart illustrating a process performed by a slice decoder control circuit.

The operation of the slice decoder control circuit 46 is described below with reference to a flow chart shown in FIG. 19.

In step S1, after setting the number of macroblocks as counted in a vertical direction of a picture, the slice decoder control circuit 46 sets the value N of the register, indicating which slice in the picture is to be processed, to an initial value of 1. In step S2, the slice decoder control circuit 46 determines whether the slice decoder 47 is in operation.

If it is determined in step S2 that the slice decoder 47 is not in operation, the process goes to step S3. In step S3, the slice decoder control circuit 46 supplies, to the slice decoder 47, parameters associated with the picture layer and a write pointer of slice N included in start code information and makes the slice decoder 47 decode slice N. Thereafter, the process goes to step S8.

In the case where it is determined in step S2 that the slice decoder 47 is in operation, the process goes to step S4. In step S4, the slice decoder control circuit 46 determines whether the slice decoder 48 is in operation. If it is determined in step S4 that the slice decoder 48 is not in operation, the process goes to step S5. In step S5, the slice decoder control circuit 46 supplies, to the slice decoder 48, the parameters associated with the picture layer and the write pointer of slice N included in the start code information and makes the slice decoder 48 decode slice N. Thereafter, the process goes to step S8.

In the case where it is determined in step S4 that the slice decoder 48 is in operation, the process goes to step S6. In step S6, the slice decoder control circuit 46 determines whether the slice decoder 49 is in operation. If it is determined in step S6 that the slice decoder 49 is in operation, the process returns to step S2 to repeat the operation described above.

If it is determined in step S6 that the slice decoder 49 is not in operation, the process goes to step S7. In step S7, the slice decoder control circuit 46 supplies, to the slice decoder 49, the parameters associated with the picture layer and the write pointer of slice N included in the start code information and makes the slice decoder 49 decode slice N. Thereafter, the process goes to step S8.

In step S8, the slice decoder control circuit 46 increments, by 1, the value N of the register indicating which slice in the coded stream is to be processed. In step S9, the slice decoder control circuit 46 determines whether the decoding is completed for all slices. If it is determined in step S9 that the decoding is not completed for all slices, the process returns to step S2 to repeat the operation described above. In the case where it is determined in step S9 that the decoding has been completed for all slices, the process of the slice decoder control circuit 46 is ended.

Figure 20:
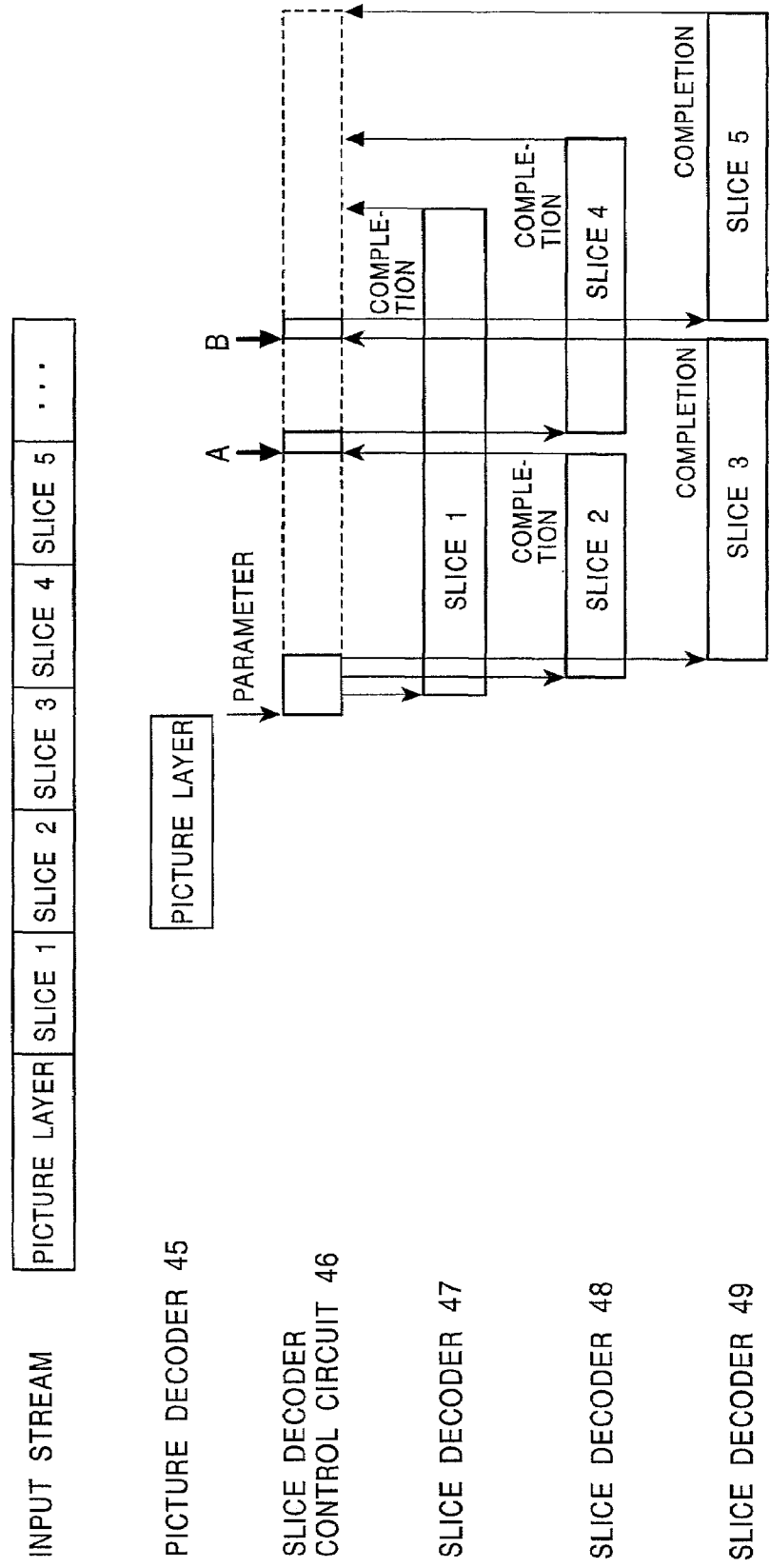
FIG. 20 is a flow chart illustrating a specific example of a process performed by the slice decoder control circuit 46.

Referring to FIG. 20, a specific example of the process performed by the slice decoder control circuit 46 described above with reference to FIG. 19 is described below. As described above, the picture decoder 45 decodes data in the picture layer and the obtained parameters are supplied to the slice decoder control circuit 46. In step S1 described above with reference to FIG. 19, after setting the number of macroblocks as counted in the vertical direction of a picture (that is, the maximum allowable value for N of the register), the slice decoder control circuit 46 initialize the value N of the register to 1. In this specific example, it is determined in next step S2 that the slice decoder 47 is not in operation, and thus, the process goes to step S3. In step S3, the slice decoder control circuit 46 supplies the parameters of the picture layer and the write pointer associated with slice 1 included in the start code information to the slice decoder 47. In response, the slice decoder 47 decodes slice N (N=1 in this specific case). In step S8, the slice decoder control circuit 46 increments the value N of the register by 1. In step S9, it is determined that the decoding is not completed for all slices, and thus the process returns to step S2.

In step 2, it is determined that the slice decoder 47 is in operation. Thus, the process goes to step S4. In step S4, it is determined it the slice decoder 48 is not in operation. Thus, the process goes to step S5, the slice decoder control circuit 46 supplies the parameters of the picture layer and the write pointer associated with slice 2 to the slice decoder 48. In response, the slice decoder 48 decodes slice N (N=2 in this specific case). In step S8, the slice decoder control circuit 46 increments the value N of the register by 1. In step S9, it is determined that the decoding is not completed for all slices, and thus the process returns to step S2.

In step S2, it is determined that the slice decoder 47 is in operation. Thus, the process goes to step S4. In step S4, it is determined it the slice decoder 48 is also in operation. Thus, the process goes to step S6. In step S6, it is determined it the slice decoder 49 is not in operation. Thus, the process goes to step S7, the slice decoder control circuit 46 supplies the parameters of the picture layer and the write pointer associated with slice 3 to the slice decoder 49. In response, the slice decoder 49 decodes slice N (N=3 in this specific case). In step S8, the slice decoder control circuit 46 increments the value N of the register by 1. In step S9, it is determined that the decoding is not completed for all slices, and thus the process returns to step S2.

When decoding of the given slice is completed, the slice decoders 47 to 49 output a signal indicating the 4 decoding to the slice decoder control circuit 46. In other words, it is determined that all the slice decoders 47 to 49 are in operation until any one of the slice decoders 47 to 49 outputs the signal indication completion of decoding of a slice, and thus steps S2, S4, and S6 are performed repeatedly. If, at a time denoted by A in FIG. 20, the slice decoder 48 outputs a signal indicating the completion of decoding to the slice decoder control circuit 46, then in step S4, it is determined that the slice decoder 48 is not in operation, and thus in step S5 the slice decoder control circuit 46 supplies the write pointer associated with the slice 4 to the slice decoder 48. In response, the slice decoder 48 decodes the slice N (N=4 in this specific case). In step S8, the slice decoder control circuit 46 increments the value N of the register by 1. In step S9, it is determined that the decoding is not completed for all slices, and thus the process returns to step S2.

Thereafter, the slice decoder control circuit 46 repeats steps S2, S4, and S6 until a signal indicating the completion of decoding is received from one of the slice decoders 47 to 49. If, at a time denoted by B in FIG. 20, the slice decoder control circuit 46 receives a signal indication the completion of decoding from the slice decoder 49, then in step S6 the slice decoder control circuit 46 determines that the slice decoder 49 is not in operation. Thus in step S7 the slice decoder control circuit 46 supplies the write pointer associated with slice 5 to the slice decoder 49. In response, the slice decoder 49 decodes slice N (N=5 in this specific case). In step S8, the slice decoder control circuit 46 increments the value N of the register by 1. In step S9, it is determined that the decoding is not completed for all slices, and thus the process returns to step S2. The above process is performed repeatedly until decoding of the last slice is completed.

As described above, the slice decoder control circuit 46 selects one of the slice decoders 47 to 49 to be used to decode a slice depending upon the states of the slice decoders 47 to 49 so that decoding is efficiently performed by the slice decoders 47 to 49.

Referring to a flow chart shown in FIG. 21, arbitration among the slice decoders performed by the motion compensation circuit 50 is described below.

In step S21, the motion compensation circuit 50 initializes the internal registers Reg_REQ_A, Reg_REQ_B, and Reg_REQ_C such that Reg_REQ_A=0, Reg-REQ-B=0, Reg_REQ_C=0.

In step S22, the motion compensation circuit 50 determines whether the values of the registers are all equal to 0. If it is determined in step S22 that the values of all registers are not equal to 0 (that is, at least one register has a value equal to 1), the process goes to step S24.

In the case where it is determined in step S22 that the values of registers are all equal to 0,the process goes to step S23. In step S23, the motion compensation circuit 50 updates the values of the registers in accordance with the REQ signals output from the slice recorders 47 to 49. That is, if the REQ signal is output from the slice decoder 47, Reg_REQ_A is set to 1. In the case where the REQ signal is output from the slice decoder 48, Reg_REQ_B is set to 1. If the REQ signal is output from the slice decoder 49, Reg_REQ_C is set to 1. Thereafter, the process goes to step S24.

In step S24, the motion compensation circuit 50 determines whether Reg_REQ_A=1. If it is determined in step S24 that Reg_REQ_A=1,the process goes to step S25. In step S25, the motion compensation circuit 50 transmits an ACK signal to the slice decoder 47 and resets Reg_REQ_A to 0. The slice decoder 47 outputs to the motion compensation circuit 50 a prediction vector decoded by the vector decoder 82 and pixel data subjected to the inverse DCT performed by the inverse DCT circuit 84. Thereafter the process goes to step S30.

In the case where it is determined in step S24 that Reg_REQ_A is not equal to 1,the process goes to step S26. In step S26, the motion compensation circuit 50 determines whether Reg_REQ_B=1. If it is determined in step S26 that Reg_REQ_B=1,the process goes to step S27. In step S27, the motion compensation circuit 50 transmits an ACK signal to the slice decoder 48 and resets Reg_REQ_B to 0. The slice decoder 48 outputs, to the motion compensation circuit 50, a prediction vector decoded by the vector decoder 86 and pixel data subjected to the inverse DCT performed by the inverse DCT circuit 88. Thereafter the process goes to step S30.

In the case where it is determined in step S26 that Reg_REQ_B is not equal to 1,the process goes to step S28. In step S28, the motion compensation circuit 50 determines whether Reg_REQ_C=1. If it is determined in step S28 that Reg_REQ_C is not equal to 1,the process returns to step S22 to repeat the above operation.

In the case where it is determined in step S28 that Reg_REQ_C=1, the process goes to step S29. In step S29, the motion compensation circuit 50 transmits an ACK signal to the slice decoder 49 and resets Reg_REQ_C to 0. The slice decoder 49 outputs, to the motion compensation circuit 50, a prediction vector decoded by the vector decoder 90 and pixel data subjected to the inverse DCT performed by the inverse DCT circuit 92. Thereafter the process goes to step S30.

In step S30, the motion compensation circuit 50 determines whether a macroblock received from one of the slice decoders 47 to 49 needs motion compensation.

If it is determined in step S30 that the macroblock needs motion compensation, the process goes to step S31. In step S31, the motion compensation circuit 50 performs motion compensation upon the received macroblock. That is, in accordance with the prediction vector output from corresponding one of the slice decoders 47 to 49, if the pixel data of the given macroblock is luminance data, the motion compensation circuit 50 reads reference pixel data from the luminance buffer 71 via the luminance buffer control circuit 51, while if the pixel data of the given macroblock is color difference data, the motion compensation circuit 50 reads reference pixel data from the color difference buffer 72 via the color difference buffer control circuit 52, and the motion compensation circuit 50 adds the obtained reference picture data to the pixel data supplied from one the slice decoders 47 to 49 thereby performing motion compensation.

After completion of the motion compensation, the motion compensation circuit 50 writes the resultant pixel data to the luminance buffer 71 via the luminance buffer control circuit 51 if the pixel data is luminance data or to the color difference buffer 72 via the color difference buffer control circuit 52 if the pixel data is color difference data in preparation for outputting display data and also for future use as reference data for another pixel data. Thereafter, the process returns to step S22 to repeat the above operation.

In the case where it is determined in step S30 that the given macroblock does not need motion compensation, the process goes to step S32. In step S32, the motion compensation circuit 50 writes the pixel data to the luminance buffer 71 via the luminance buffer control circuit 51 if the pixel data is luminance data or to the color difference buffer 72 via the color difference buffer control circuit 52 if the pixel data is color difference data in preparation for outputting display data and also for future use as reference data for another picture. Thereafter, the process returns to step S22 to repeat the above operation.

Figure 21:
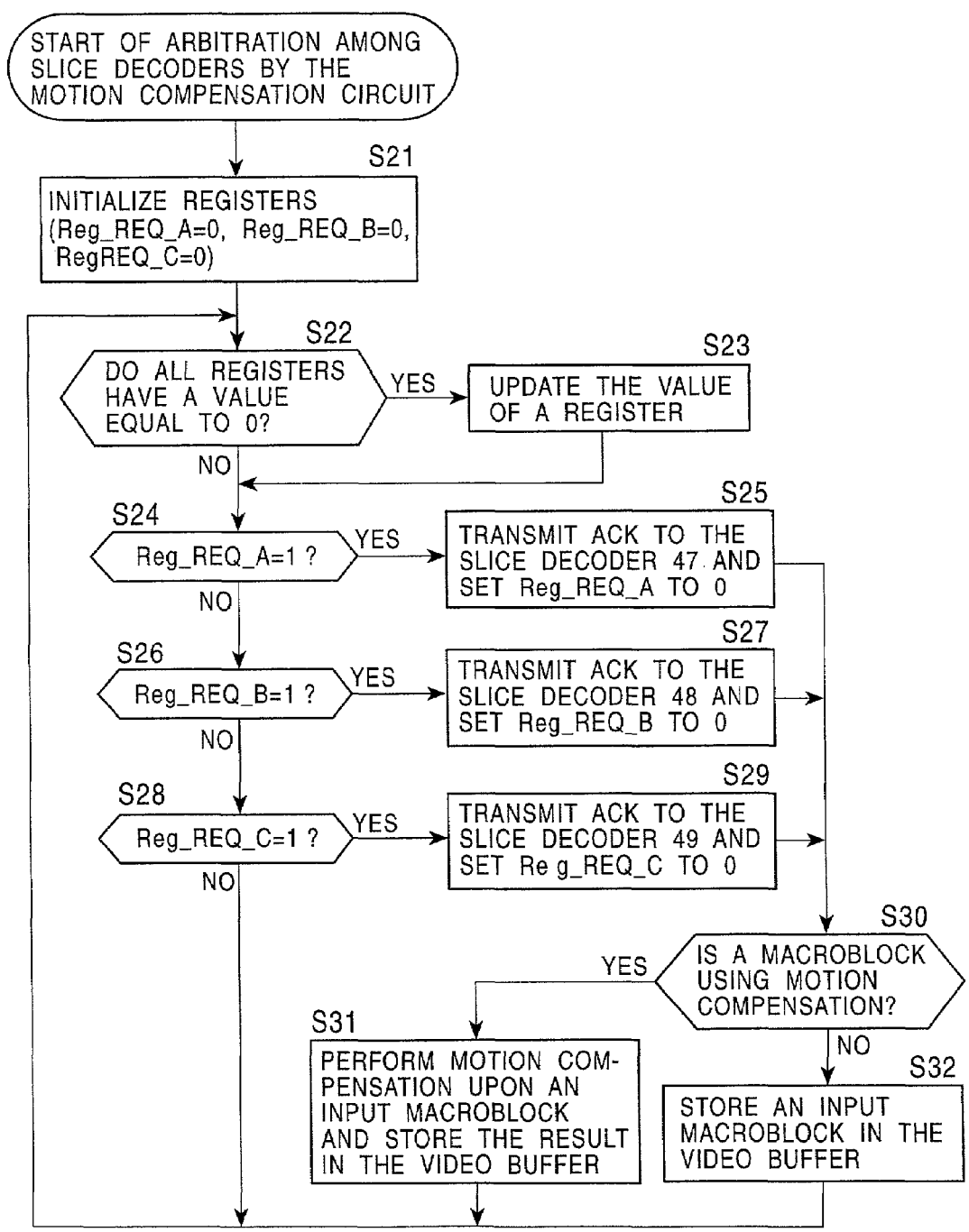
FIG. 21 is a flow chart illustrating an arbitration process among slice decoders performed by a motion compensation circuit.
Figure 22:
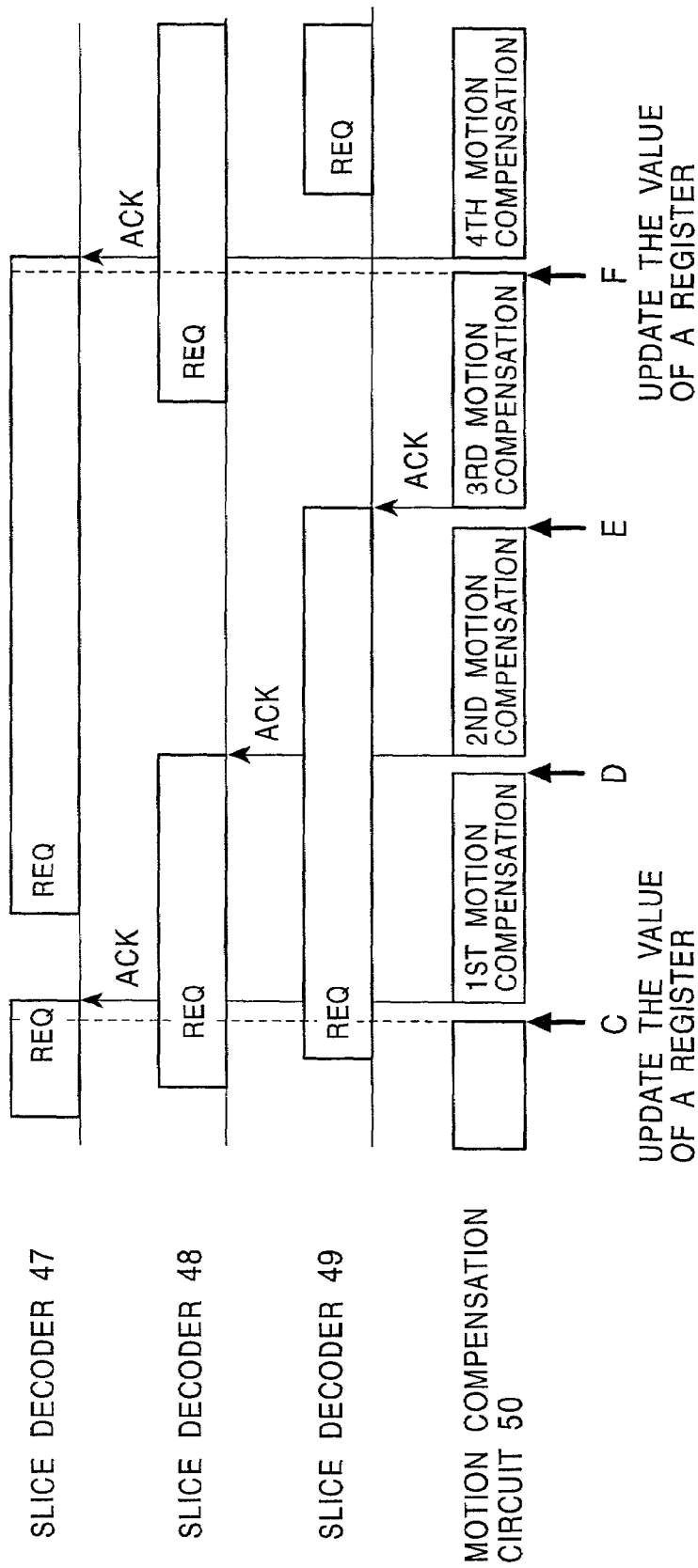
FIG. 22 is a diagram illustrating a specific example of the arbitration process among slice decoders performed by the motion compensation circuit.

Referring to FIG. 22, a specific example of the arbitration process among the decoders performed by the motion compensation circuit 50 described above with reference to FIG. 21 is described below.

If, at a time denoted by C in FIG. 22, it is determined in step S22 in FIG. 21 that the values of the registers of the motion compensation circuit 50 are all equal to 0,that is, all the slice decoders 47 to 49 output the REQ signal, the process goes to step S23 to update the values of the registers such that Reg_REQ_A=1, Reg_REQ_B=1, and Reg_REQ_C=1. In step S24, it is determined that Reg_REQ_A=1,and thus in step S25, the motion compensation circuit 50 outputs an ACK signal to the slice decoder 47 and resets Reg_REQ A to 0. The motion compensation circuit 50 receives a prediction vector and pixel data from the slice decoder 47 and performs a 1st motion compensation process.

When the 1st motion compensation process is completed at a time denoted by D in FIG. 22, the process returns to step S22. At the time denoted by D in FIG. 22, the REQ signal is output from the slice decoder 47. However, the values of the registers are such that Reg_REQ_A=0, Reg_REQ_B=1, and Reg_REQ_C=1, and thus it is determined in step S22 that all the values of the registers are not equal to 0. As a result, the process goes to step S24 without updating the value of any register.

In step S24, it is determined that Reg_REQ_A=0, and thus the process goes to step S26 in which it is determined that Reg_REQ_B=1. Thus, in step S27, the motion compensation circuit 50 outputs an ACK signal to the slice decoder 48 and resets Reg_REQ_B to 0. The motion compensation circuit 50 receives a prediction vector and pixel data from the slice decoder 48 and performs a 2nd motion compensation process.

When the 2nd motion compensation process is completed at a time denoted by E in FIG. 22, the process returns to step S22. Also at the time denoted by E in FIG. 22, the REQ signal is output from the slice decoder 47. However, because the values of the registers are such that Reg_REQ_A=0, Reg_REQ_B=0, and Reg_REQ_C=1, it is determined in step S22 that all the values of the registers are not equal to 0. As a result, the value of any register is not updated as at the time denoted by D in FIG. 22.

Thereafter, it is determined in step S24 that Reg_REQ_A=0, and it is determined in step S26 that Reg_REQ B=0. Furthermore, in step S28 it is determined that Reg_REQ_C=1. Thus, in step S29, the motion compensation circuit 50 outputs an ACK signal to the slice decoder 49 and resets Reg_REQ_C to 0. The motion compensation circuit 50 receives a prediction vector and pixel data from the slice decoder 49 and performs a 3rd motion compensation process.

When the 3rd motion compensation process is completed at a time denoted by F in FIG. 22, the process again returns to step S22. At the time denoted by F in FIG. 22, the values of the registers are such that Reg_REQ_A=0, Reg_REQ_B=0, and Reg_REQ_C=0, and thus in step S23 the values of the registers are updated such that Reg_REQ_A=1, Reg_REQ_B=1, and Reg_REQ_C=0.

Thereafter, in step S24, it is determined that Reg_REQ_A=1, and a 4th motion compensation process is performed in a similar manner.

By performing the above-described process repeatedly, the motion compensation circuit 50 performs motion compensation while arbitrating among the slice decoders 47 to 49.

As described above, in the MPEG video decoder 40 according to the present invention, the start code buffer 62 provided therein makes it possible for the picture decoder 45 and the slice decoders 47 to 49 to access the stream buffer 61 without having to wait for completion of the operations of the other decoders. Furthermore, the slice decoders 47 to 49 can operate in parallel under the control of the slice decoder control circuit 46. Furthermore, the motion compensation circuit 50 selects proper one of the slice decoders 47 to 49 and performs motion compensation by accessing the luminance buffer 71 and the color difference buffer 72 which are provided separately from each other. As can be understood from the above description, because the MPEG decoder 40 has the enhanced decoding performance and also enhanced performance in accessing to the buffers, it is possible to decode a 4:2:2P@HL/MPEG-2 video bit stream in real time.

The capability needed to decode an MP@ML/MPEG-2 video bit stream in real time is as low as ⅙ the capability needed to decode a 4:2:2P@HL/MPEG-2 video bit stream. In other words, the MPEG video decoder 40 according to the present invention can reproduce an MP@ML/MPEG-2 video bit stream at an increased speed by a factor of up to 6.

Figure 23:
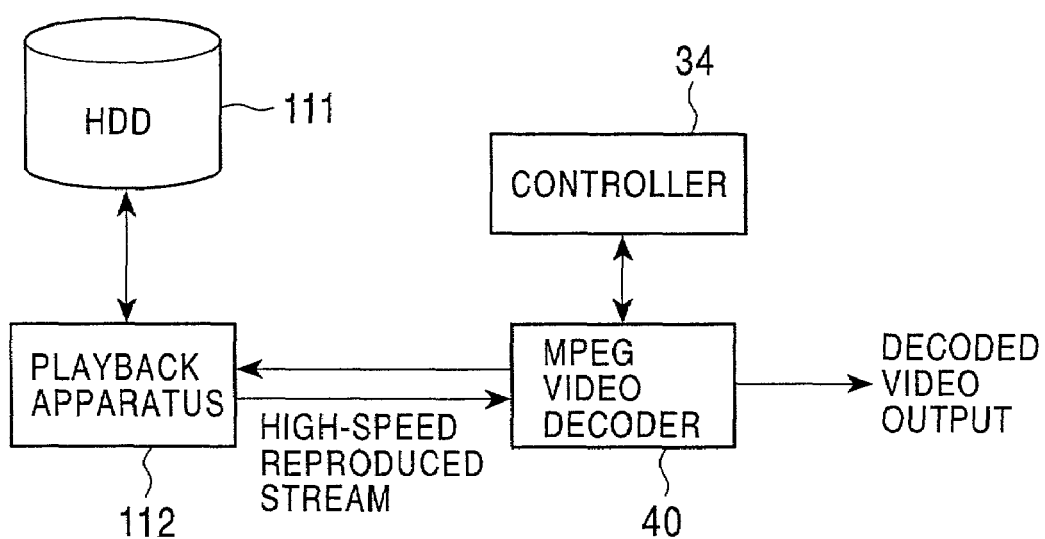
FIG. 23 is a block diagram illustrating an example of a construction of a system for reproducing an MP@ML coded stream at a high speed using the MPEG video decoder.

More specifically, for example, if the MPEG video decoder 40 is employed in a system shown in FIG. 23, it becomes possible to reproduce an MP@ML/MPEG-2 video bit stream at a high speed.

In this system, an MP@ML/MPEG-2 video bit stream is stored on a hard disk drive (HDD) 111. Under the control of the controller 34 of the MPEG video decoder 40, a playback apparatus 112 reads the MP@ML/MPEG-2 video bit stream stored on the hard disk 111 at a higher speed (for example 6 times higher) than a normal speed, and supplies the high-speed stream to the MPEG video decoder 40.

Figure 24:
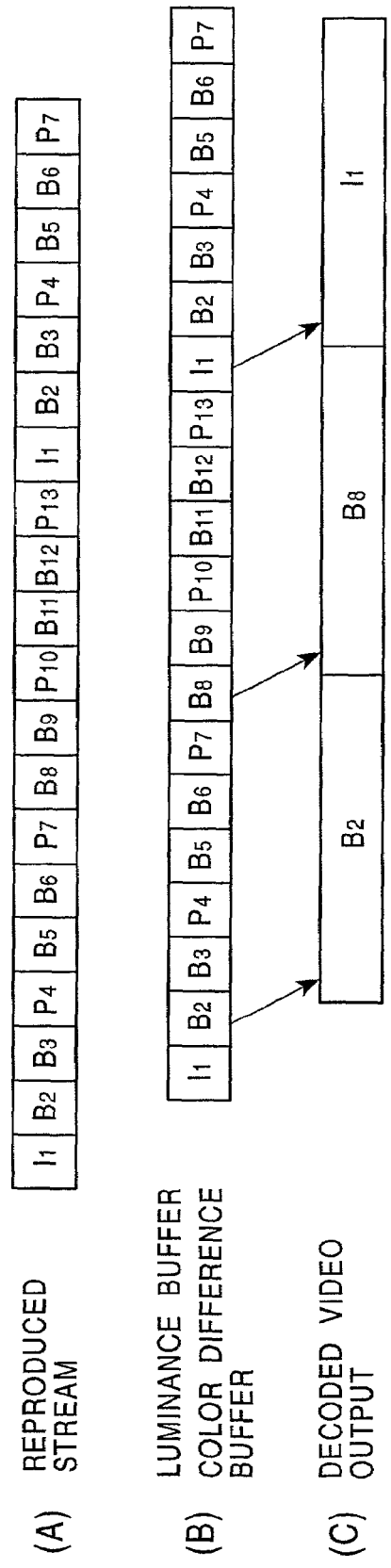
FIG. 24 is a diagram illustrating processing performed by the MPEG video decoder to reproduce an MP@ML coded stream at a high speed.

For example, an MP@ML/MPEG-2 video bit stream such as that shown in FIG. 24(A) is completely decoded by the MPEG video decoder 40 without omitting any part of the decoding process, and the resultant decoded data is written into the luminance buffer 71 and the color difference buffer 72 as shown in FIG. 24(B). If the picture data written in the luminance buffer 71 and the color difference buffer 72 is read by the display signal output circuit 53 such that one frame is read every sixth frame regardless of the picture type, and if the resultant picture data is output as a decoded video signal to a following stage, the picture is played back at a speed 6 times the normal speed.

If the picture data written in the luminance buffer 71 and the color difference buffer 72 is read by the display signal output circuit 53 such that one frame is read every third frame regardless of the picture type, and if the resultant picture data is output as a decoded video signal to the following stage, the picture is played back at a speed 3 times the normal speed.

That is, if the picture data written in the luminance buffer 71 and the color difference buffer 72 is read by the display signal output circuit 53 such that one frame is read every Xth frame regardless of the picture type, and if the resultant picture data is output as a decoded video signal to the following stage, the picture is played back at a high speed X times the normal speed. In the case where X=0, the picture is played back in a still mode.

As described above, in the MPEG video decoder 40, by reading one frame every particular number of frames using the display signal output circuit 53, it is possible to output a picture with natural motion without causing jerky motion.

If the MPEG video decoder 40 capable of reproducing an MP@ML/MPEG-2 video bit stream at a high speed is employed in editing of video data, a user can easily understand the content of a picture represented by a video signal. Furthermore, it is possible to quickly retrieve a desired editing location, and thus the editing can be performed in a highly efficient fashion.

If two additional display signal output circuits similar to that described above are provided in the MPEG video decoder 40 shown in FIG. 18 such that the MPEG video decoder has a total of three output systems, it becomes possible to decode an MPEG-2 video bit stream input at a speed 6 times the normal speed and output the resultant decoded video signal at a playback speed 3 times the normal speed sequentially via the three output systems.

The present invention may also be applied to an application in which a 2:1-interlaced 30-frames/sec MP@ML/MPEG-2 video bit stream is read at a speed twice the normal speed from a storage medium, and a picture is output in a non-interlaced form at a rate of 60 frames/sec.

Although in the system shown in FIG. 23, an MP@ML/MPEG-2 video bit stream is stored on the hard disk drive 111, another type of storage medium may be used instead of the hard disk driver 111 if it is capable of reading an MP@ML/MPEG-2 video bit stream at a speed 6 times the normal speed.

Figure 25:
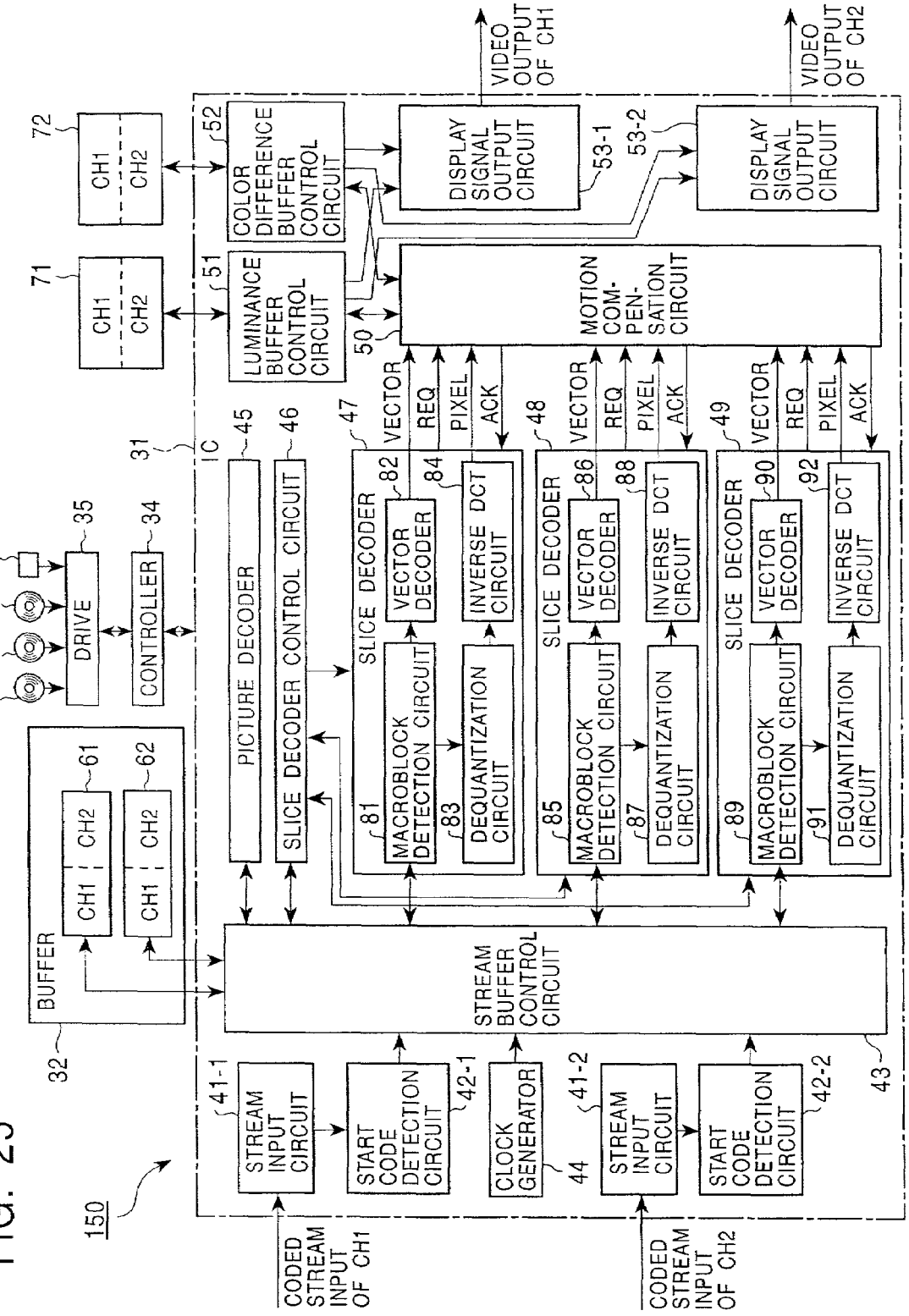
FIG. 25 is a block diagram illustrating another example of a construction of an MPEG video decoder according to the present invention.

A second example of a construction of an MPEG video decoder according to the present invention is described below with reference to FIG. 25. This MPEG video decoder 130 decodes coded streams of a plurality of channels (in this specific example, coded streams of channels CH1 and CH2) in parallel and supplies the resultant video outputs of CH1 and CH2 to a following stage. As with the MPEG video decoder 40 shown in FIG. 18, the MPEG video decoder 130 has the capability of decoding at a speed 6 times faster than the conventional video decoder shown in FIG. 15.

The difference in construction between the MPEG video decoder 130 and the MPEG video decoder 40 is described below. In the MPEG video decoder 130, the stream input circuit 41, the star code detection circuit 42 and the display signal output circuit 53 in the MPEG video decoder 40 are respectively replaced with corresponding parts dedicated to handling of channels CH1 and CH2. That is, for channel CH1, a stream input circuit 41-1, a start code detection circuit 42-1 and a display signal output circuit 53-1 are provided, and a stream input circuit 41-2, a start code detection circuit 42-2 and a display signal output circuit 53-2 are provided for channel CH2. Furthermore, in the MPEG video decoder 130, the stream buffer 61, the start code buffer 62, the luminance buffer 71, and the color difference buffer 72 of the buffer 32 respectively have storage areas for use for channel CH1 and channel CH2. coded stream (MPEG-2 video bit stream) of channel CH1 and supplies it to the start code detection circuit 42-1. The start code detection circuit 42-1 supplies the received coded stream of channel CH1 to the stream buffer control circuit 43. The start code detection circuit 42-1 also detects a start code described earlier with reference to FIG. 14 and generates, on the basis of the detected start code, start code information including data indicating the type of the start code and a write pointer indicating a location in the storage area for use for channel CH1 in the stream buffer 61 at which the start code is to be written. The generated start code information is supplied to the stream buffer control circuit 43.

Similarly, the stream input circuit 41-2 receives a high-efficiency coded stream (MPEG-2 video bit stream) of channel CH2 and supplies it to the start code detection circuit 42-2. The start code detection circuit 42-2 supplies the received coded stream of channel CH2 to the stream buffer control circuit 43. The start code detection circuit 42-2 also detects a start code described earlier with reference to FIG. 14 and generates, on the basis of the detected start code, start code information including data indicating the type of the start code and a write pointer indicating a location in the storage area for use for channel CH1 in the stream buffer 61 at which the start code is to be written. The generated start code information is supplied to the stream buffer control circuit 43.

The display signal output circuit 53-1 generates a synchronization timing signal used in outputting of decoded picture data of channel CH1. In accordance with the timing signal, the display signal output circuit 53 reads luminance data from the luminance buffer 71 via the luminance buffer control circuit 51 and also reads color difference data from the color difference buffer 72 via the color difference buffer control circuit 52, and the display signal output circuit 53-1 outputs them as a decoded video signal of channel CH1.

Similarly, the display signal output circuit 53-2 generates a synchronization timing signal used in outputting of decoded picture data of channel CH1. In accordance with the timing signal, the display signal output circuit 53 reads luminance data from the luminance buffer 71 via the luminance buffer control circuit 51 and also reads color difference data from the color difference buffer 72 via the color difference buffer control circuit 52, and the display signal output circuit 53-2 outputs them as a decoded video signal of channel CH1.

The other circuit components in the MPEG video decoder 130 are similar to those, denoted by similar reference numerals, of the MPEG video decoder 40, and thus they are not described in further detail herein.

Figure 26:
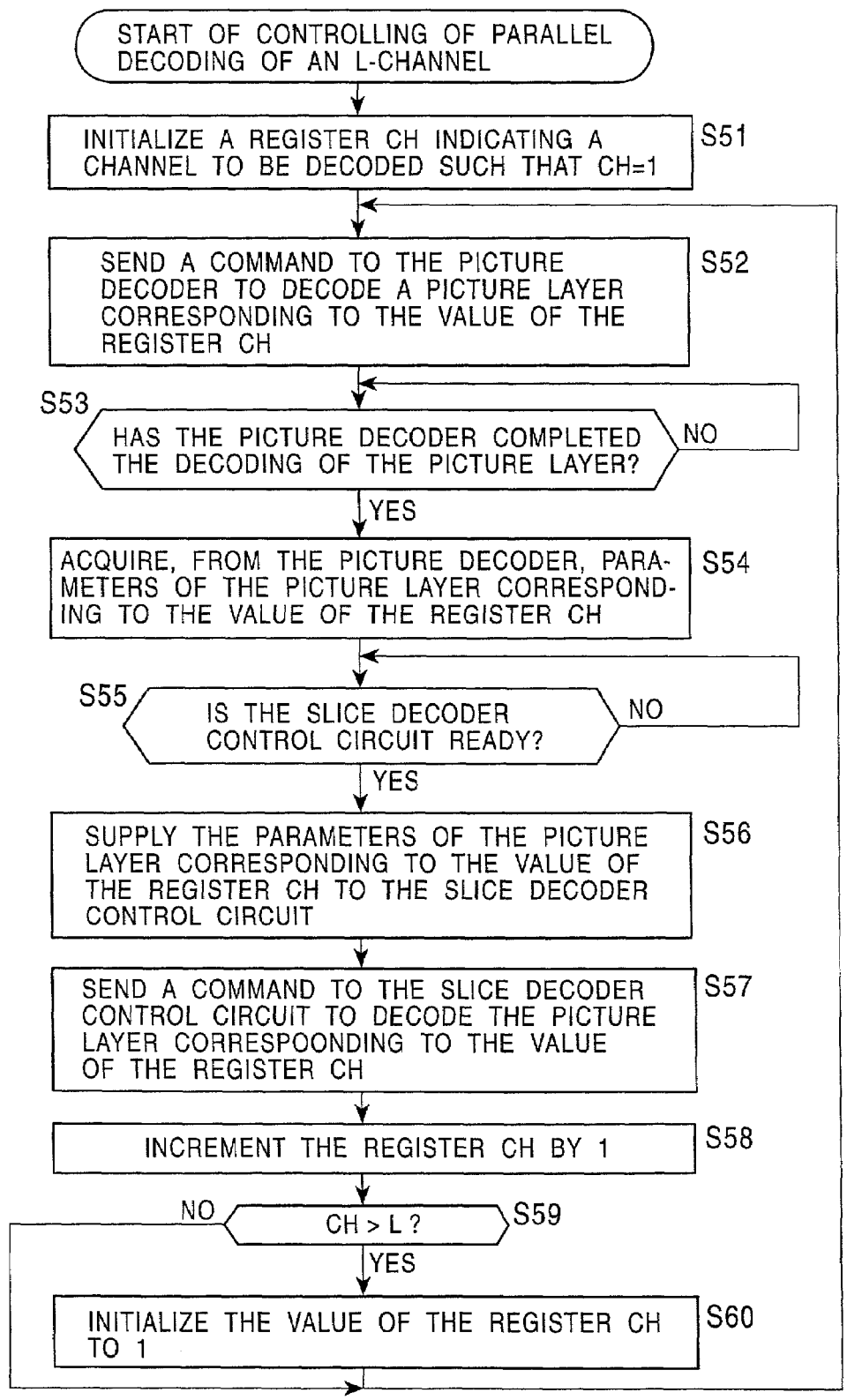
FIG. 26 is a flow chart illustrating a process performed by the MPEG video decoder under the control of a controller provided therein to decode as many channels as L channels in parallel.

Referring to a flow chart shown in FIG. 26, a process performed by the MPEG video decoder 130 under the control of the controller 34 to decode as many channels as L channels (L=2 in this specific example) in parallel is described below.

In step S51, the controller 34 initializes an internal register CH indicating which channel is to be decoded. In step S52, the controller 34 commands the picture decoder 45 to decode a picture layer of a channel corresponding to the value of the register CH. In step S53, the controller 34 determines whether the picture decoder 45 has completed the decoding of the picture layer of the channel (channel CH1, in this specific case) corresponding to the value of the register CH. If the decoding is not completed, the controller 34 waits in step S53 until the decoding is completed.

During the waiting period, in accordance with the command from the controller 34, the picture decoder 45 reads start code information from the storage area, assigned for use for channel CH1, in the start code buffer 62 of the buffer 32 via the stream buffer control circuit 43 and detects a write pointer of sequence_header indicating the start point at which decoding is to be started. In accordance with the detected write pointer of sequence_header associated with channel CH1, the picture decoder 45 reads sequence_header from the storage area, assigned for use for channel CH1, in the stream buffer 61 of the buffer 32 and decodes it. Similarly, the picture decoder 45 further reads sequence_extension, GOP_header, picture_header, and picture_coding_extension from the storage area, assigned for use for channel CH1, in the stream buffer 61 and decodes them. Furthermore, the picture decoder 45 reads start code information from the storage area, assigned for use for channel CH1, in the stream buffer 61 and detects a write pointer associated with a first slice.

At this stage at which all parameters of the picture layer required for decoding of the picture of channel CH1 have been obtained, the picture decoder 45 notifies the controller 34 that the decoding of the picture layer has been completed.

In accordance with the notification, the controller 34 determines in step S53 that the decoding of the picture layer has been completed. Thereafter, the process goes to step S54. In step S54, the controller 34 acquires from the picture decoder 45 the decoded parameters associated with the picture layer of channel CH1 and stores them. In step S55, the controller 34 determines whether the slice decoder 46 is ready (whether the slice decoder 46 has completed a previous process). If the slice decoder 46 is not ready, the controller 34 waits in step S55 until the slice decoder 46 becomes ready. If it is determined that the slice decoder 46 is ready, the process goes to step S56.

In step S56, the controller 34 supplies the parameters associated with the picture layer of channel CH1, which are stored after being acquired from the picture decoder 45, to the slice decoder control circuit 46. In step S57, the controller 34 commands the slice decoder control circuit 46 and the motion compensation circuit 50 to decode a slice layer of channel CH1.

In response to the command, the slice decoder control circuit 46 assigns respective slices of channel CH1 to the slice decoders 47 to 49 to decode them. The details of the above operation are similar to the operation described above with reference to FIGS. 19 and 20, and thus the operation is not described herein in further detail. In response to the above command, the motion compensation circuit 50 performs arbitration among requests issued by the slice decoders 47 to 49. The arbitration process is similar to that described above with reference to FIGS. 21 and 22, and thus it is not described in further detail herein.

When the decoding of one picture of channel CH1 is completed via the process described above, the slice decoder control circuit 46 notifies the controller 34 that the decoding of one picture has been completed.

In response to the notification, the controller 34 increments, in step S58, the value of the register CH by 1. In this specific case, the value of the register CH is incremented from 1 to 2. In step S59, the controller 34 determines whether the value of the register CH is greater than L. In the case where it is determined that the value of the register CH is not greater than L, the process returns to step S52 and the process described above is repeated. In this specific case, L is equal to 2 and the value of the register CH is equal to 2, and thus the process returns to step S52 to perform the operation for channel CH2 in steps S52 to S57.

Thus, if the value of the register CH is again incremented by 1 (from 2 to 3 in this specific case) in step S58, then it is determined in step S59 that the value of the register CH is greater than L. Thus, the process goes to step S60. In step S60, the controller 34 initializes the register CH to 1. Thereafter, the process returns to step S52 to repeat the above operation.

The decoding is performed in parallel for coded streams of L channels (two channels in this specific example) in the above-described manner.

In the process from steps S54 to S56 in which the controller 34 acquires the parameters associated with the picture layer from the picture decoder 45 and stores them and then supplies the stored parameters associated with the picture layer to the slice decoder control circuit 46, the process may be performed, in stead of the controller 34, by another circuit provided in the MPEG video decoder 130.

Figure 15:
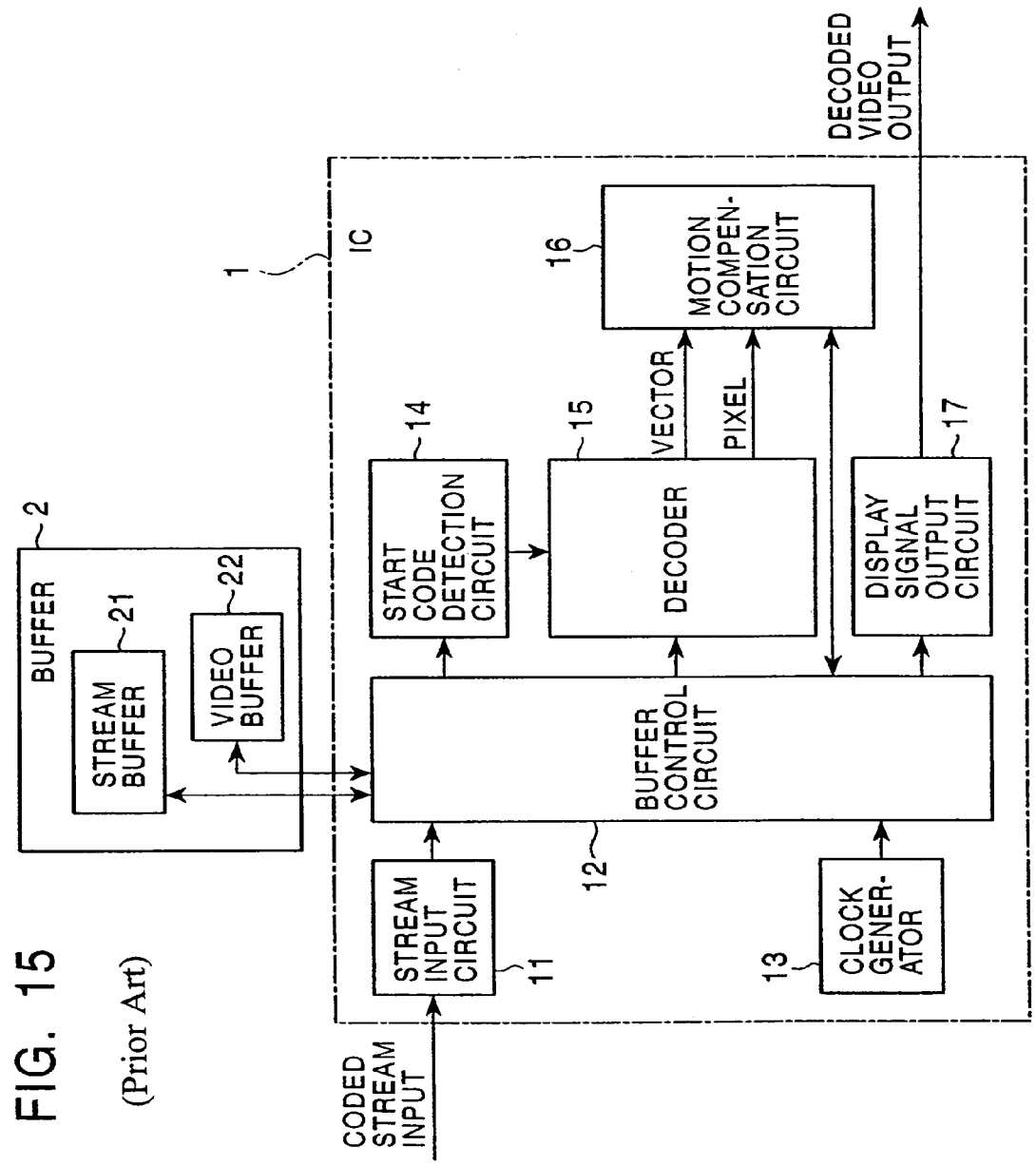
FIG. 15 is a block diagram illustrating an example of a construction of a conventional MPEG video decoder for decoding an MP@ML coded stream.

The time required for the MPEG video decoder 130 to decode one picture is as short as ⅙ the time required for the conventional MPEG video decoder shown in FIG. 15 to decode one picture (that is, the time required for decoding at a normal speed). In other words, the MPEG video decoder 130 is capable of decoding up to six channels of coded data in parallel.

Figure 27:
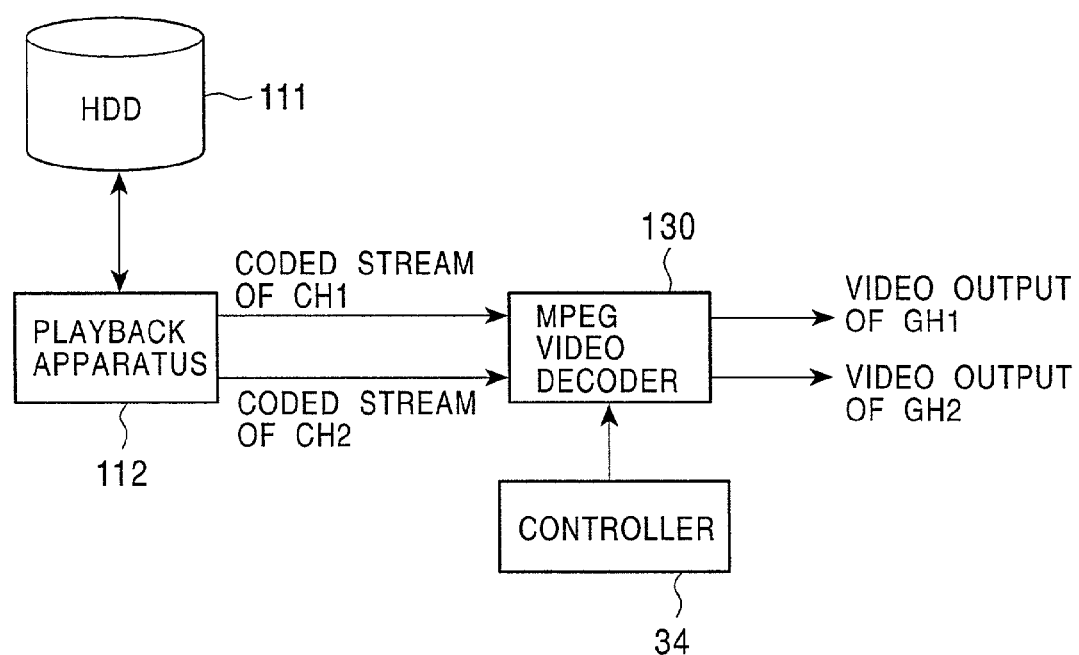
FIG. 27 is a block diagram illustrating an example of a configuration of an MPEG video server/editor system using the MPEG video decoder.

FIG. 27 illustrates an example of a configuration of an MPEG video server/editor system using the MPEG video decoder 130. In this MPEG video server/editor system, a plurality of channels of MPEG-2 video bit streams are stored on a hard disk drive. Herein, instead of the hard disk drive 111, another type of recording/reproducing device such as an optical disk drive, a magnetooptical disk driver, a magnetic tape drive, or a semiconductor memory driver may be employed.

Under the control of the controller 34, a playback apparatus 112 reads, for example, two channels of MPEG-2 video bit streams (coded streams of channels CH1 and CH2 shown in FIG. 27) of the plurality of MPEG-2 video bit streams stored on the hard disk drive 111, and the playback apparatus 112 supplies them to the MPEG video decoder 130. The MPEG video decoder 130 decodes the input coded streams of channels CH1 and CH2 in parallel in the above-described manner and supplies the resultant video outputs of channel CH1 and CH2 to a following stage. Alternatively, one of the decoded video outputs of channel CH1 and CH2 may be selected as desired and the selected video output may be supplied to the following stage.

Figure 28:
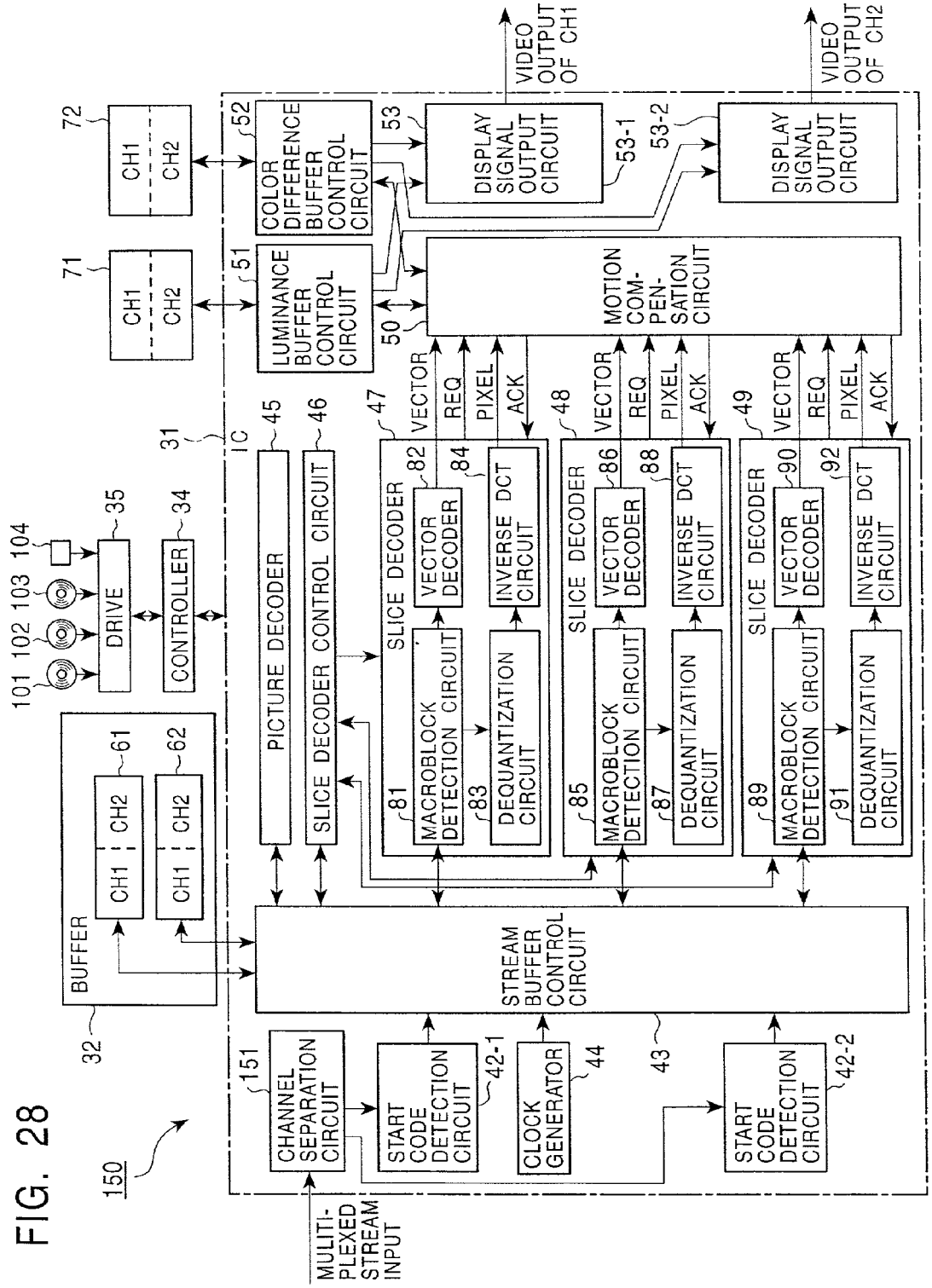
FIG. 28 is a block diagram illustrating still another example of a construction of an MPEG video decoder according to the present invention.

FIG. 28 illustrates a third example of a construction of an MPEG video decode according to the present invention. In this MPEG video decoder 150, a multiplexed stream is input, and a plurality of channels of coded streams (coded streams of channels CH1 and CH2 in this specific example) included in the multiplexed stream are decoded in parallel, and obtained video outputs of channels CH1 and CH2 are supplied to a following stage.

The MPEG video decoder 150 has a configuration obtained by replacing the stream input circuits 41-1 and 41-2 of the MPEG video decoder 130 shown in FIG. 23 with a channel separation circuit 151. The channel separation circuit 151 separates an input multiplexed stream (that is, a transport stream on which MPEG video streams are multiplexed) into coded streams of channels CH1 and CH2. The coded stream of channel CH1 is supplied to the start code detection circuit 42-1 and the coded stream of channel CH2 is supplied to the start code detection circuit 42-2.

The other circuit components of the MPEG video decoder 150 are similar to those, denoted by similar reference numerals, of the MPEG video decoder 130, and thus they are not described in further detail herein. The operations of the start code detection circuits 42-1 and 42-2 and following circuit components in the MPEG video decoder 150 are similar to those of the corresponding circuit components of the MPEG video decoder 130, and thus they are not described in further detail herein.

An example of an application of the MPEG video decoder 150 is described below with reference to FIG. 29. Herein, as with the MPEG video decoder 130 shown in FIG. 25, the MPEG video decoder 150 has the capability of decoding at a speed 6 times faster than the conventional video decoder shown in FIG. 15. In other words, the MPEG video decoder 150 is capable of decoding in parallel up to six channels of coded streams of coded streams multiplexed on an input multiplexed stream.

This technique may be used to realize picture composition known as wipe in which, as shown in FIG. 29, coded streams of channels CH1 and CH2 are selectively separated from a multiplexed stream and decoded in parallel, and the obtained video outputs of channel CH1 and CH2 are supplied to a video switcher 161 which in turn gradually switches a video picture of channel CH1 to a video picture of channel CH2.

The process described above may be executed by software. When the process is executed by software, a program forming the software may be installed from a storage medium onto a computer which is provided as dedicated hardware or may be installed onto a general-purpose computer capable of performing various processes in accordance with various programs installed thereon.

Various types of storage media such as those shown in FIG. 18 may be used for the above purpose. That is, specific examples of storage media for this purpose include a magnetic disk 101 (such as a floppy disk), an optical disk 102 (such as a CD-ROM (Compact Disk-Read Only Memory) and a DVD (Digital Versatile Disk)), a magnetooptical disk 103 (such as an MD (Mini-Disk)), and a semiconductor memory 104, in the form of a package medium on which a program is stored and which is supplied to a user separately from a computer.

In the present description, the steps described in the program stored in the storage medium may be performed either in time sequence in accordance with the order described in the program or in a parallel or separate fashion.

In the present description, the term "system" is used to represent an entire set of apparatuses.

As can be understood from the above description, the present invention provides great advantages. That is, in the first decoding apparatus, the first decoding method, and the program stored on the first storage medium, according to the present invention, decoding of a speeded-up coded stream is controlled such that the decoding is performed in parallel, and a picture corresponding to the decoded speeded-up coded stream is output at an arbitrary speed thereby making it possible to realize a video decoder with a realistic circuit scale capable of reproducing an MP@ML/MPEG-2 video bit stream at an arbitrary speed.

In the second decoding apparatus, the second decoding method, and the program stored on the second storage medium, according to the present invention, a plurality of slice decoders are controlled such that they operate in parallel to decode a speeded-up coded stream, and a picture corresponding to the decoded speeded-up coded stream is output at an arbitrary speed thereby making it possible to realize a video decoder with a realistic circuit scale capable of reproducing an MP@ML/MPEG-2 video bit stream at an arbitrary speed.

In the third decoding apparatus, the third decoding method, and the program stored on the third storage medium, according to the present invention, a plurality of coded streams are decoded in parallel, and a plurality of pictures corresponding to the resultant plurality of decoded streams are output, thereby making it possible to realize a video decoder capable of decoding a plurality of channels of coded streams in parallel.

In the fourth decoding apparatus, the fourth decoding method, and the program stored on the fourth storage medium, according to the present invention, a plurality of coded streams are decoded in parallel by a plurality of slice decoders, and a plurality of pictures corresponding to the plurality of streams decoded by the plurality of slice decoders are output, thereby making it possible to realize a video decoder capable of decoding a plurality of channels of coded streams in parallel.

What is claimed is:

1. A decoding apparatus for decoding a coded stream, comprising:
    input means for inputting a speeded-up coded stream, comprising a plurality of coded streams;
    a plurality of decoding means for decoding said speeded-up coded stream;
    a plurality of decoding control means for controlling said plurality of decoding means such that said plurality of decoding means operate in parallel;
    selection means for selecting a particular one of a plurality of picture data decoded and output by said plurality of decoding means; and
    output control means for outputting, at an arbitrary playback speed, a picture corresponding to each of said plurality of coded streams of said speeded-up coded stream decoded by said plurality of decoding means,
    wherein said plurality of decoding means output an end signal indicating completion of decoding to said selection means, said selection means includes storage means for storing a value corresponding to a processing state of each of said plurality of decoding means such that when values stored in said storage means all become equal to a first value, a value stored therein corresponding to decoding means outputting said end signal indicating completion of decoding is changed from said first value to a second value.

2. A decoding apparatus according to claim 1, wherein said speeded-up code-d stream is an MPEG-2 video bit stream having a bit rate increased by a predetermined factor.

3. A decoding apparatus according to claim 2, wherein said output control means outputs a picture corresponding to said MPEG-2 video bit stream having the bit rate increased by the predetermined factor, at a playback speed increased by a factor within the range from zero to a predetermined value.

4. A decoding apparatus according to claim 1, wherein said decoding means outputs a signal indicating completion of decoding to said decoding control means, and said decoding control means controls said decoding means which has output said signal indicating the completion of decoding such that said decoding means decodes another coded stream.

5. A decoding apparatus according to claim 1, further comprising:
  first buffer means for buffering said speeded-up coded stream;
  reading means for reading from said speeded-up coded stream a start code indicating the start of a predetermined unit of information included in said speeded-up coded stream and further reading position information indicating a location in said buffer means at which said start code is stored;
  second buffering means for buffering said start code and said position information read by said reading means; and
  buffering control means for controlling buffering of said speeded-up coded stream by said first buffering means and buffering of said start code and said position information by said second buffering means.

6. A decoding apparatus according to claim 1, further comprising:
  selection means for selecting a particular one of a plurality of picture data decoded and output by said plurality of decoding means; and
  compensation means which receives the picture data selected by said selection means and performs motion compensation, as required, upon the received picture data.

7. A decoding apparatus for decoding a coded stream, comprising:
  input means for inputting a speeded-up coded stream;
  a plurality of decoding means for decoding said speeded-up coded stream comprising a plurality of coded streams;
  a plurality of decoding control means for controlling said plurality of decoding means such that said plurality of decoding means operate in parallel;
  output control means for outputting, at an arbitrary playback speed, a picture corresponding to each of said plurality of coded streams of said speeded-up coded stream decoded by said plurality of decoding means;
  selection means for selecting a particular one of a plurality of picture data decoded and output by said plurality of decoding means; and
  compensation means which receives the picture data selected by said selection means and performs motion compensation, as required, upon the received picture data,
  wherein said plurality of decoding means output an end signal indicating completion of decoding to said selection means, said selection means includes storage means for storing a value corresponding to a processing state of each of said plurality of decoding means such that:
  when values stored in said storage means all become equal to a first value, a value stored therein corresponding to decoding means outputting said end signal indicating completion of decoding is changed from said first value to a second value,
  one of picture data decoded by said first decoding means corresponding to the second value stored in said storage means is selected, and
  the values, stored in said storage means, corresponding to said decoding means which has decoded said selected picture data is changed to said first value.

8. A decoding apparatus according to claim 6, further comprising:
  storage means for storing said picture data selected by said selection means or said picture data subjected to motion compensation performed by said motion compensation means; and
  storage control means for controlling the storage, in said storage means, of said picture data selected by said selection means or said picture data subjected to motion compensation performed by said motion compensation means.

9. A decoding apparatus according to claim 8, wherein said storage means stores a luminance component and a color difference component of said picture data separately from each other.

10. A decoding method for a decoding apparatus for decoding a coded stream, comprising:
  an inputting step of inputting a speeded-up coded stream comprising a plurality of coded streams;
  plurality of decoding steps of decoding the speeded-up coded stream;
  a decoding control, step of controlling said plurality of decoding steps such that said plurality of decoding steps are performed in parallel;
  a selecting step of selecting a particular one of a plurality of picture data decoded and output in said plurality of decoding steps; and
  an output control step of outputting, at an arbitrary playback speed, a picture corresponding to each of said plurality of coded streams of said speeded-up coded stream decoded in said plurality of decoding steps,
  wherein said plurality of decoding steps output an end signal indicating completion of decoding to said selecting step, said selecting step includes a storing step for storing a value corresponding to a processing state of each of said plurality of decoding steps such that when values stored in said storage means all become equal to a first value, a value stored therein corresponding to a decoding step outputting said end signal indicating completion of decoding is changed from said first value to a second value.

11. The decoding apparatus of claim 1, wherein said plurality of decoding means comprise a plurality of slice decoders.

12. The decoding apparatus of claim 1, wherein said output control means is operable to output a plurality of pictures corresponding to the plurality of coded streams decoded by said plurality of decoding means.

13. The decoding apparatus of claim 1, wherein said coded stream is an MPEG-2 video bit stream.

14. A decoding apparatus according to claim 12, wherein said decoding means outputs a signal indicating completion of decoding to said decoding control means,
  and said decoding control means controls said decoding means which has output said signal indicating the completion of decoding such that said decoding means decodes another coded stream.

15. A decoding apparatus according to claim 12, further comprising:
  first buffer means for buffering said speeded-up coded stream;

reading means for reading from said speeded-up coded stream a start code indicating the start of a predetermined unit of information included in said speeded-up coded stream and further reading position information indicating a location in said buffer means at which said start code is stored;

second buffering means for buffering said start code and said position information read by said reading means; and buffering control means for controlling buffering of said speeded-up coded stream by said first buffering means and buffering of said start code and said position information by said second buffering means.

16. A decoding apparatus according to claim 12, further comprising:

selection means for selecting a particular one of a plurality of picture data decoded and output by said plurality of decoding means; and compensation means which receives the picture data selected by said selection means and performs motion compensation, as required, upon the received picture data.

17. A decoding apparatus according to claim 16, further comprising:

storage means for storing said picture data selected by said selection means or said picture data subjected to motion compensation performed by said motion compensation means; and storage control means for controlling the storage, in said storage means, of said picture data selected by said selection means or said picture data subjected to motion compensation performed by said motion compensation means.

18. A decoding apparatus according to claim 17, wherein said storage means stores a luminance component and a color difference component of said picture data separately from each other.

19. A decoding apparatus according to claim 12, further comprising:

acceptance means for accepting a multiplexed stream on which said plurality of coded streams are multiplexed; and supply means for separating said multiplexed stream into the plurality of coded streams and supplying said plurality of coded streams to said input means.

20. The decoding apparatus of claim 1, wherein said plurality of decoding means comprise a plurality of slice decoders; and said output control means is operable to output a plurality of pictures corresponding to said plurality of coded streams decoded by said plurality of slice decoders.

21. The decoding method of claim 10, wherein said decoding apparatus includes a plurality of slice decoders for decoding said speeded-up coded stream, said deciding control step comprises a slice decoder control step of controlling said plurality of slice decoders such that said plurality of slice decoders operate in parallel, and said output control step comprises outputting, at an arbitrary playback speed, a picture corresponding to said speeded-up coded stream decoded by said plurality of slice decoders.

22. The decoding method of claim 10, wherein said output control step comprises outputting a plurality of pictures corresponding to said plurality of coded streams decoded in said plurality of decoding steps.

23. The decoding method of claim 10, wherein said deciding apparatus includes a plurality of slice decoders for decoding said speeded-up stream, said decoding control step comprises a slice decoder control step of controlling said plurality if slice decoders such that said plurality if slice decoders operate in parallel, and said output control step comprises outputting a plurality of pictures corresponding ti said plurality of coded streams decoded by said plurality of slice decoders.

24. A decoding apparatus for decoding a coded stream, comprising:

input means for inputting a speeded-up coded stream;

a plurality of decoding means for decoding said speeded-up coded stream comprising a plurality of coded streams;

a plurality of decoding control means for controlling said plurality of decoding means such that said plurality of decoding means operate in parallel;

output control means for outputting, at an arbitrary playback speed, a picture corresponding to each of said plurality of coded streams of said speeded-up coded stream decoded by said plurality of decoding means;

selection means for selecting a particular one of a plurality of picture data decoded and output by said plurality of decoding means; and compensation means which receives the picture data selected by said selection means and performs motion compensation, as required, upon the received picture data, wherein said output control means is operable to output a plurality of pictures corresponding to the plurality of coded streams decoded by said plurality of decoding means, wherein said plurality of decoding means output an end signal indicating completion of decoding to said selection means, wherein said selection means includes storage means for storing a value corresponding to a processing state of each of said plurality of decoding means such that:

when values stored in said storage means all become equal to a first value, a value stored therein corresponding to decoding means outputting said end signal indicating completion of decoding is changed from said first value to a second value, one of picture data decoded by said first decoding means corresponding to the second value stored in said storage means is selected, and the values, stored in said storage means, corresponding to said decoding means which has decoded said selected picture data is changed to said first value.

* * * * *